(12) United States Patent
Teramoto et al.

(10) Patent No.: US 7,392,109 B2
(45) Date of Patent: Jun. 24, 2008

(54) SYSTEM FOR INTEGRALLY GENERATING NC DATA

(75) Inventors: Kazunari Teramoto, Aichi (JP); Yoshimasa Kuwano, Aichi (JP)

(73) Assignee: Kabushiki Kaisha Toyota Chuokenkyusho, Aichi-gun (JP)

( * ) Notice: Subject to any disclaimer, the term of this patent is extended or adjusted under 35 U.S.C. 154(b) by 158 days.

(21) Appl. No.: 10/333,908

(22) PCT Filed: Jul. 31, 2001

(86) PCT No.: PCT/JP01/06582

§ 371 (c)(1),
(2), (4) Date: Jan. 31, 2003

(87) PCT Pub. No.: WO02/10870

PCT Pub. Date: Feb. 7, 2002

(65) Prior Publication Data

US 2003/0171842 A1 Sep. 11, 2003

(30) Foreign Application Priority Data

Jul. 31, 2000 (JP) .............................. 2000-232239

(51) Int. Cl.
*G06F 19/00* (2006.01)

(52) U.S. Cl. ........................ 700/182; 700/173; 700/178

(58) Field of Classification Search ................. 700/173, 700/178, 180, 182
See application file for complete search history.

(56) References Cited

U.S. PATENT DOCUMENTS

| 5,815,400 A | * | 9/1998 | Hirai et al. ................... 700/173 |
| 6,502,007 B1 | * | 12/2002 | Kanamoto et al. ........... 700/173 |
| 6,591,156 B1 | | 7/2003 | Fukaya et al. |

FOREIGN PATENT DOCUMENTS

| JP | 61219552 A | * | 9/1986 |
| JP | 5-224723 | | 9/1993 |
| JP | 5-224726 | | 9/1993 |
| JP | 7-104821 | | 4/1995 |

(Continued)

OTHER PUBLICATIONS

Translation of JP 61219552 A.*

(Continued)

*Primary Examiner*—Ryan A Jarrett
(74) *Attorney, Agent, or Firm*—Oblon, Spivak, McClelland, Maier & Neustadt, P.C.

(57) ABSTRACT

To complete a CAM operation without requiring manual operations for generating NC data, which enables accurate and rapid machining, through organized integration of each means and increase in the speed to determine conditions. To achieve this, the present invention comprises a shape input means 1 for inputting a shape of a work piece; a machining planning means 2 for planning a machining method of the work piece; an NC data generating means 3 for generating NC data used for machining the work piece; an NC data verifying and editing means 4 for verifying and editing the NC data; and an NC data output means 5 for outputting the NC data, wherein the NC data is integrally generated based on the shape data of the work piece as the work piece successively passes through these means.

5 Claims, 29 Drawing Sheets

FOREIGN PATENT DOCUMENTS

| | | |
|---|---|---|
| JP | 7-129221 | 5/1995 |
| JP | 7-251349 | 10/1995 |
| JP | 7-256536 | 10/1995 |
| JP | 7-276185 | 10/1995 |
| JP | 7-302108 | 11/1995 |
| JP | 9-062326 | 3/1997 |
| JP | 9-160625 | 6/1997 |
| JP | 9-265310 | 10/1997 |
| JP | 11-15362 | 1/1999 |
| JP | 11-235646 | 8/1999 |
| JP | 11-338529 | 12/1999 |
| JP | 2000-052191 | 2/2000 |
| JP | 2000-99125 | 4/2000 |
| JP | 2000-155610 | 6/2000 |
| JP | 2001092513 A * | 4/2001 |
| WO | WO00/38881 | 7/2000 |

OTHER PUBLICATIONS

Translation of JP 2001092513 A.*

* cited by examiner

FIG.10

| CATEGORY | | CODE |
|---|---|---|
| CAST TYPE | WHEEL TYPE | 101 |
| DIE-CAST TYPE | HEAD COVER TYPE | 201 |
| CAST TYPE | CONNECTING ROD TYPE | 301 |
| RESIN TYPE | INSTRUMENT PANEL TYPE | 401 |
| PRESSED TYPE | FENDER TYPE | 501 |

FIG.11

| MACHINING MODE | (R) + |
|---|---|
| MACHINING TYPE CODE | (21) + |
| MAXIMUM AND MINIMUM DIAMETER OF USED TOOLS | (96.00) (2.00) |
| MATERIAL CODE | (033) |
| REMAINED WIDTH | (0.100) |
| CUTTING CONDITIONS ADJUSTING CODE | (13) |
| MACHINING MODE CONVERTING CODE | (11) |
| TOOL REPLACEMENT LOAD COEFFICIENT | (30.00) |
| STAGE REPLACEMENT LOAD COEFFICIENT | (100.00) |
| MACHINING MODE | (F) + |
| MACHINING TYPE CODE | (41) + |
| MAXIMUM AND MINIMUM DIAMETER OF USED TOOLS | (20.00)(2.00) |
| MATERIAL CODE | (033) |
| ALLOWABLE CUSP HEIGHT | (0.050) |
| CUTTING CONDITIONS ADJUSTING CODE | (13) |
| MACHINING MODE CONVERTING CODE | (11) |
| TOOL REPLACEMENT LOAD COEFFICIENT | (30.00) |
| STAGE REPLACEMENT LOAD COEFFICIENT | (100.00) |

FIG.12

| CATEGORY | | CODE |
|---|---|---|
| INTEGRATED ROUGH CUTTING AND FINISH CUTTING | | 11 |
| BLOCK MATERIAL ROUGH CUTTING | UNIFORMLY LEAVING ROUGH CUTTING | 21 |
| | PRE-HARDENING ROUGH CUTTING | 22 |
| | STAGED ROUGH CUTTING | 23 |
| CASTING MATERIAL ROUGH CUTTING | UNIFORMLY LEAVING ROUGH CUTTING | 31 |
| | NORMAL ROUGH CUTTING | 32 |
| | STAGED ROUGH CUTTING | 33 |
| FINISH MACHINING | FINISH CUTTING AFTER UNIFORM LEAVING | 41 |
| | FINISH CUTTING AFTER HARDENING | 42 |
| | FINISH CUTTING AFTER STAGING | 43 |

FIG.13

| CATEGORY | | CODE |
|---|---|---|
| FERRIC METAL | ROLLED STEEL | 110 |
| | CARBON STEEL | 120 |
| | ALLOY STEEL | 130 |
| | TOOL STEEL | 140 |
| | DIES STEEL — NO HEAT TREATMENT | 151 |
| | — REFINING | 152 |
| | — HARDENING | 153 |
| | — DAC | 154 |
| | STAINLESS STEEL | 160 |
| | BEARING STEEL | 170 |
| | CAST IRON | 180 |
| NON-FERRIC METAL | ALUMINUM ALLOY | 210 |
| | ALUMINUM DIE-CAST ALLOY | 220 |
| | COPPER | 230 |
| | BRASS | 240 |

FIG.14

| CATEGORY | | CODE |
|---|---|---|
| (1) CAM-aaa | 1. CONTOUR LINE MACHINING | 11 |
| | 2. SCANNING LINE MACHINING | 12 |
| | 3. | 13 |
| (2) CAM-bbb | 1. CONTOUR LINE MACHINING | 21 |
| | 2. SCANNING LINE MACHINING | 22 |
| | 3. | 23 |

FIG.15

| CATEGORY | | CODE |
|---|---|---|
| (1) DEPTH OF CUT BEING PRIORITIZED | 1. AXIAL DIRECTION BEING PRIORITIZED | 11 |
| | 2. RADIAL DIRECTION BEING PRIORITIZED | 12 |
| | 3. SPECIFIED DIVISION/AXIAL DIRECTION BEING PRIORITIZED | 13 |
| | 4. SPECIFIED DIVISION/RADIAL DIRECTION BEING PRIORITIZED | 14 |
| | 5. UNIFORM DIVISION | 15 |
| (2) FEED RATE BEING PRIORITIZED | 1. AXIAL DIRECTION BEING PRIORITIZED | 21 |
| | 2. RADIAL DIRECTION BEING PRIORITIZED | 22 |
| | 3. SPECIFIED DIVISION/AXIAL DIRECTION BEING PRIORITIZED | 23 |
| | 4. SPECIFIED DIVISION/RADIAL DIRECTION BEING PRIORITIZED | 24 |
| | 5. UNIFORM DIVISION | 25 |

FIG.18

PROCESS TYPE: 11 (INTEGRATED ROUGH CUTTING AND FINISH CUTTING)
NUMBER OF CONDITIONS: 13

| CONDITION | PROCESS NUMBER | BALL PROCESS ORDER | TOOL TIP PROFILE | PREVIOUS MACHINING MODE | TOOL DIAMETER | PROCESS DIVISION NUMBER | MACHINING MODE | REMAINED WIDTH COEFFICIENT |
|---|---|---|---|---|---|---|---|---|
| 1 | (=) (1) | ( ) ( ) | ( FLAT ) | ( ) | ( ) | (1) | (RC) | (1.0) |
| 2 | (=) (1) | ( ) ( ) | ( RADIUS) | ( ) | ( ) | (1) | (RC) | (1.0) |
| 3 | (=) (1) | ( ) ( ) | (BALL ) | ( ) | ( ) | (1) | (RC) | (1.0) |
| 4 | (>) (1) | ( ) ( ) | ( FLAT ) | ( ) | ( ) | (1) | (MC) | (0.8) |
| 5 | (>) (1) | ( ) ( ) | ( RADIUS) | ( ) | ( ) | (1) | (MC) | (0.8) |
| 6 | (>) (1) | (=) (1) | (BALL ) | ( ) | (>20) | (1) | (MC) | (0.6) |
| 7 | (>) (1) | (=) (1) | (BALL ) | ( ) | (<20) | (2) | (MC+) (FC+) | (0.6) (0.0) |
| 8 | (>) (1) | (>) (1) | (BALL ) | (RC) | (>20) | (1) | (MC) | (0.6) |
| 9 | (>) (1) | (>) (1) | (BALL ) | (RC) | (<20) | (2) | (MC+) (FC+) | (0.6) (0.0) |
| 10 | (>) (1) | (>) (1) | (BALL ) | (MC) | (>20) | (1) | (MC) | (0.6) |
| 11 | (>) (1) | (>) (1) | (BALL ) | (MC) | (<20) | (2) | (MC+) (FC+) | (0.6) (0.0) |
| 12 | (>) (1) | (>) (1) | (BALL ) | (FC) | ( ) | (2) | (LMC) (LFC) | (0.3) (0.0) |
| 13 | (>) (1) | (>) (1) | (BALL ) | (LFC) | ( ) | (2) | (LMC) (LFC) | (0.3) (0.0) |

FIG.19

| R C | ROUGH CUTTING |
| --- | --- |
| M C | MIDDLE-FINISH CUTTING |
| M C+ | MIDDLE-FINISH CUTTING WITH SMOOTHING |
| F C | FINISH CUTTING |
| F C+ | FINISH CUTTING WITH SMOOTHING |
| L M C | LOCAL MIDDLE-FINISH CUTTING |
| L F C | LOCAL FINISH CUTTING |

FIG.20

| CONDITION | INPUT CONDITION | OUTPUT MACHINING MODE |
|---|---|---|
| 1 | USE FLAT TOOL IN PROCESS 1 | ROUGH CUTTING |
| 2 | USE RADIUS TOOL IN PROCESS 1 | ROUGH CUTTING |
| 3 | USE BALL TOOL IN PROCESS 1 | ROUGH CUTTING |
| 4 | USE FLAT TOOL IN PROCESS 2 OR LATER | MIDDLE-FINISH CUTTING |
| 5 | USE RADIUS TOOL IN PROCESS 2 OR LATER | MIDDLE-FINISH CUTTING |
| 6 | USE FIRST BALL TOOL HAVING TOOL DIAMETER OF $\leq \phi 20MM$ IN PROCESS 2 OR LATER | MIDDLE-FINISH CUTTING |
| 7 | USE FIRST BALL TOOL HAVING TOOL DIAMETER OF $\geq \phi 20MM$ IN PROCESS 2 OR LATER | CONDUCT MIDDLE-FINISH CUTTING WITH SMOOTHING AND FINISH CUTTING WITH SMOOTHING SUCCESSIVELY |
| 8 | USE BALL TOOL OTHER THAN FIRST BALL TOOL HAVING TOOL DIAMETER OF $\leq \phi 20MM$ WITH PREVIOUS MACHINING MODE BEING ROUGH CUTTING | MIDDLE-FINISH CUTTING |
| 9 | USE BALL TOOL OTHER THAN FIRST BALL TOOL HAVING TOOL DIAMETER OF $\geq \phi 20MM$ WITH PREVIOUS MACHINING MODE BEING ROUGH CUTTING | CONDUCT MIDDLE-FINISH CUTTING WITH SMOOTHING AND FINISH CUTTING WITH SMOOTHING SUCCESSIVELY |
| 10 | USE BALL TOOL OTHER THAN FIRST BALL TOOL HAVING TOOL DIAMETER OF $\leq \phi 20MM$ WITH PREVIOUS MACHINING MODE BEING MIDDLE-FINISH CUTTING | MIDDLE-FINISH CUTTING |
| 11 | USE BALL TOOL OTHER THAN FIRST BALL TOOL HAVING TOOL DIAMETER OF $\geq \phi 20MM$ WITH PREVIOUS MACHINING MODE BEING MIDDLE-FINISH CUTTING | CONDUCT MIDDLE-FINISH CUTTING WITH SMOOTHING AND FINISH CUTTING WITH SMOOTHING SUCCESSIVELY |
| 12 | USE BALL TOOL OTHER THAN FIRST BALL TOOL WITH PREVIOUS MACHINING MODE BEING FINISH CUTTING | CONDUCT LOCAL MIDDLE-FINISH CUTTING AND LOCAL FINISH CUTTING SUCCESSIVELY |
| 13 | USE BALL TOOL OTHER THAN FIRST BALL TOOL WITH PREVIOUS MACHINING MODE BEING LOCAL FINISH CUTTING | CONDUCT LOCAL MIDDLE-FINISH CUTTING AND LOCAL FINISH CUTTING SUCCESSIVELY |

FIG.21

MACHINING MODE CONVERTING CODE (11)
(CAM-aaa/CONTOUR LINE MACHINING)

| MACHINING MODE CODE | PROCESS TYPE | PROCESS DIVISION NUMBER | CAM MACHINING MODE |
|---|---|---|---|
| (RC) | (ROUGH CUTTING) | (1) | (CONTOUR LINE ROUGH CUTTING) |
| (MC) | (MIDDLE-FINISH CUTTING) | (1) | (CONTOUR LINE STAGED MIDDLE-FINISH CUTTING) |
| (MC+) | (MIDDLE-FINISH CUTTING WITH SMOOTHING) | (2) | (CONTOUR LINE STAGED MIDDLE-FINISH CUTTING) (CONTOUR LINE OPTIMIZATION) |
| (FC) | (FINISH CUTTING) | (1) | (CONTOUR LINE FINISH CUTTING) |
| (FC+) | (FINISH CUTTING WITH SMOOTHING) | (2) | (CONTOUR LINE FINISH CUTTING) (CONTOUR LINE OPTIMIZATION) |
| (LMC) | (LOCAL MIDDLE-FINISH CUTTING) | (2) | (CONTOUR LINE STAGED MIDDLE-FINISH CUTTING) (CONTOUR LINE OPTIMIZATION) |
| (LFC) | (LOCAL FINISH CUTTING) | (1) | (CORNER MACHINING ALONG SURFACE) |

FIG.22

| INPUT | OUTPUT |
| --- | --- |
| MACHINING MODE (CODE) | CAM MACHINING MODE (CODE) |
| ROUGH CUTTING (RC) | CONTOUR LINE ROUGH CUTTING (TA) |
| MIDDLE-FINISH CUTTING (MC) | CONTOUR LINE STAGED MIDDLE-FINISH CUTTING (TDN) |
| MIDDLE-FINISH CUTTING WITH SMOOTHING (MC+) | CONTOUR LINE STAGED MIDDLE-FINISH CUTTING (TDN) CONTOUR LINE OPTIMIZATION (TBC) |
| FINISH CUTTING (FC) | CONTOUR LINE FINISH CUTTING (TS) |
| FINISH CUTTING WITH SMOOTHING (FC+) | CONTOUR LINE FINISH CUTTING (TS) CONTOUR LINE OPTIMIZATION (TBC) |
| LOCAL MIDDLE-FINISH CUTTING (LMC) | CONTOUR LINE STAGED MIDDLE-FINISH CUTTING (TDN) CONTOUR LINE OPTIMIZATION (TBC) |
| LOCAL FINISH CUTTING (LFC) | CORNER MACHINING ALONG SURFACE (MS) |

FIG.23

| TA  | CONTOUR LINE ROUGH CUTTING |
| --- | --- |
| TBC | CONTOUR LINE OPTIMIZATION |
| TDN | CONTOUR LINE STAGED MIDDLE-FINISH CUTTING |
| TS  | CONTOUR LINE FINISH CUTTING |
| MS  | CORNER MACHINING ALONG SURFACE |

FIG.24

ADJUSTING CODE (13)
NUMBER OF ADJUSTING STAGE (3)

|  |  | DEPTH OF CUT IN AXIAL DIRECTION | DEPTH OF CUT IN RADIAL DIRECTION | FEED RATE |
|---|---|---|---|---|
| FIRST STAGE | ADJUSTING RATIO | (5 0) | (5 0) | ( 0) |
|  | LOWER LIMIT VALUE | (0.100) mm | (0.500) mm | ( ) mm/min |
| SECOND STAGE | ADJUSTING RATIO | ( 0) | (1 0 0) | ( 0) |
|  | LOWER LIMIT VALUE | ( ) mm | (0.300) mm | ( ) mm/min |
| THIRD STAGE | ADJUSTING RATIO | ( 0) | ( 0) | (1 0 0) |
|  | LOWER LIMIT VALUE | ( ) mm | ( ) mm | (0.010) mm/min |

FIG.30

| PRODUCT TYPE CODE | ORIGINAL POSITION OF MACHINING | ( XL) | ( YL) | ( ZL) |
|---|---|---|---|---|
| (101) | TOOL MOVEMENT START POSITION | ( 0.0) | ( 0.0) | (200.0) |
| | RAPID MOVEMENT Z PLANE | | | ( 150.0) |
| | APPROACHING AND RETRACTING CODE | | | ( 11) |
| PRODUCT TYPE CODE | ORIGINAL POSITION OF MACHINING | ( XU) | ( YU) | ( ZU) |
| (102) | TOOL MOVEMENT START POSITION | ( 0.0) | ( 0.0) | (200.0) |
| | RAPID MOVEMENT Z PLANE | | | ( 150.0) |
| | APPROACHING AND RETRACTING CODE | | | ( 13) |

FIG.31

| APPROACHING AND RETRACTING CODE (11) | | |
|---|---|---|
| CONTOUR LINE ROUGH CUTTING (TA) | METHOD OF APPROACHING | ( ZSPI) |
| | RAPID MOVEMENT APPROACH LIMIT | ( 10.0) |
| | APPROACH OPERATION START POSITION | ( 5.0) |
| | RAPID MOVEMENT RETRACT START POSITION | ( 10.0) |
| CONTOUR LINE MIDDLE-FINISH CUTTING (TM) | METHOD OF APPROACHING | ( ZCIR) |
| | RAPID MOVEMENT APPROACH LIMIT | ( 15.0) |
| | APPROACH OPERATION START POSITION | ( 10.0) |
| | RAPID MOVEMENT RETRACT START POSITION | ( 10.0) |
| CONTOUR LINE FINISH CUTTING (TS) | METHOD OF APPROACHING | ( ZDOW) |
| | RAPID MOVEMENT APPROACH LIMIT | ( 10.0) |
| | APPROACH OPERATION START POSITION | ( 10.0) |
| | RAPID MOVEMENT RETRACT START POSITION | ( 10.0) |

SYSTEM FOR INTEGRALLY GENERATING NC DATA

TECHNICAL FIELD

The present invention relates to an integrated CAM system, a method of integrally generating NC data, a machining planning system, a machining data generating apparatus and a program. In particular, the present invention relates to an integrated CAM system, a method of integrally generating NC data, a machining planning system, a machining data generating apparatus and a program that are preferably used in machining three-dimensional free-form surfaces such as a surface of a die or mold cavity.

BACKGROUND ART

Conventionally, mechanical and electrical machining of products using NC data are conducted in various industrial fields. In the mechanical machining, machining operation has been simplified by using, for example, computer-aided simulation in various machining.

In commercially-available conventional CAM systems, operations such as generating and editing of a tool path and converting of NC data can be conducted with computer aid. However, these systems require interactive operations such as determining of machining procedure, tool profile, tooling (a form of a whole tool system including holder and the like), machining mode and cutting conditions that depend on an operator, and even editing of the tool path of the CAM depends on an operator.

Under these circumstances, the present inventors have proposed a method of determining tooling, which is disclosed in Japanese Patent Application Laid-Open (JP-A) No. 9-179620, and have automated the determination of tooling with computer-aid that allows correction of cutting conditions considering tooling rigidity and the like.

In the mechanical machining, information regarding machining method is determined at proper times, and the present inventors have proposed a method therefor disclosed, for example, in the publication of JP-A No. 11-235646. The determining method disclosed in the publication generates a plurality of candidate process orders, the method comprising: selecting candidate processes in descending order of machining efficiency among a plurality of candidate processes to rapidly determine a machining method with high machining efficiency; seeking, based on the shapes before and after machining, a maximum machining area that can be machined with a selected candidate process; seeking a difference between the maximum machining area and the shape after machining; repeating the selecting of candidate process until the difference becomes within tolerance; arranging the selected candidate processes; and setting the finally selected candidate process as the final process.

In this manner, the method determines a machining method by, for each candidate process order, seeking effective machining time based on machining capabilities, machining amount and loading time of each process; seeking the sum of effective machining time by summing up the effective machining time of each process; and setting a candidate process order with the shortest sum of effective machining time as the machining method. This method has a great effect in that the machining time is reduced.

In NC machining, however, demand for a further improved machining accuracy and workability is increasing. Even if a conventional NC machining system is computer-aided and employs an NC machining simulator and a commercially-available CAM, the system requires an operator to perform staged operations. That is, the conventional system requires cogitation of a skilled operator in determination of machining procedure, tool profile, tooling (a form of a whole tool system including holder and the like), machining mode, cutting conditions, and the like. The conventional system also requires correction of cutting conditions, and the like, at the final stage of establishing conditions after a commercially-available CAM is used. Thus, it is difficult to reduce time in establishing conditions in the conventional system. For more complicated machining, such as machining a work piece having especially complex profile, a larger number of cutting conditions must be corrected and problems in machining accuracy and machining speed remain unsolved.

The present invention has been devised to solve these problems and an object of the present invention is to improve machining accuracy and operation speed by automating determination of machining procedure, tool profile, tooling (a form of a whole tool system including holder and the like), machining mode, cutting conditions, and the like. Another object of the present invention is to provide an integrated CAM system, a method of integrally generating NC data, a machining planning system, a machining data generating apparatus and a program that remarkably improve the speed of condition determination and realize accurate and rapid machining even in machining a complex profile that conventionally required a number of manual operations.

DISCLOSURE OF THE INVENTION

To solve above-described problems, a first invention provides an integrated CAM system comprising: a shape input means that inputs a shape of a work piece; a machining planning means that plans a machining method of the work piece; an NC data generating means that generates NC data used for machining the work piece; an NC data verifying and editing means that verifies and edits the NC data; and an NC data output means that outputs the NC data, wherein the NC data is integrally generated based on shape data of a work piece as the work piece successively passes through these means. With the integrated CAM system of the first invention, because the CAM operation can be completed without requiring manual operations in determining cutting conditions and the like, and NC data of high quality can be stably obtained, determination of conditions can be completed in a remarkably reduced time. Further, a work piece having complex profile that conventionally required a number of manual operations can be accurately and rapidly machined with fewer number of man-hour and in a reduced lead time, and the problem of lack of skilled operators can also be resolved.

The first invention further provides an integrated CAM system in which the machining planning means that plans a machining method includes a process determining means that determines processes in consideration of minimum machining cost, with which the process with reduced machining cost can be established. The machining planning means also includes a machining condition determining means that determines, for each determined process, tooling conditions represented by a combination of a tool and a holder in consideration of machining time, tool movement conditions suitable for the process, and cutting conditions suitable for the process, with which the machining planning can be automated without requiring cogitation of an operator and can be completed with fewer number of man-hour and in a reduced lead time. In the integrated CAM system, machine design information can be obtained with which, because the machining accuracy is improved by setting the cutting conditions in accordance with the tooling, determination of the condition can be completed in a remarkably reduced time, and even a work piece having complex profile that conventionally required a number of manual operations can be accurately and rapidly machined.

The first invention further provides an integrated CAM system in which the machining planning means includes a machining information database that contains a rule for determining a machining mode, a rule for determining cutting conditions and/or data for computing machining capabilities. With the machining information database, practical machining planning information in light of historical performance can be obtained and a further practical machining planning can be realized.

The first invention further provides an integrated CAM system in which the NC data generating means that generates NC data includes a tool path computing means which considers tooling interference, uncut areas in a previous process, and overlap with a tool path of the previous process, or considers uncut areas in the previous process and overlap with the tool path of the previous process. With the tool path computing means, because the integrated CAM system obtains NC data based on an efficient tool path, determination of the condition can be completed in a remarkably reduced time and accurate and rapid machining can be realized.

The first invention further provides an integrated CAM system in which machining area data generated by the machining planning means is fed to the NC data generating means, and thus the tool path computing means in the NC data generating means can devoid of a tool path computing function in consideration of interference in tooling. In the integrated CAM system, NC data can be obtained with which, even when the NC data generating means has a reduced function, determination of conditions can be completed in a remarkably reduced time and an accurate and rapid machining can be realized.

The first invention further provides an integrated CAM system in which the NC data verifying and editing means that verifies and edits the NC data includes a feed rate correcting means that verifies a cutting load and corrects a feed rate in accordance with the verified cutting load. With the feed rate correcting means, a stable machining with appropriate load can be realized. The NC data verifying and editing means further includes an NC data deleting and editing means for emptily cutting portions that verifies emptily cutting portions and deletes NC data corresponding to the emptily cutting portions, and edits the NC data around the emptily cutting portions in consideration of the effects on machining. With the NC data deleting and editing means, machining time can be minimized by eliminating emptily cutting portions. In the integrated CAM system, NC data can be obtained with which determination of conditions can be completed in a remarkably reduced time and an accurate and rapid machining can be realized.

The first invention further provides an integrated CAM system in which a dedicated interface is interposed between the machining planning means and the NC data generating means, and/or between the NC data generating means and the NC data verifying and editing means. With this structure, the machining planning means and the NC data generating means, or the NC data generating means and the NC data verifying and editing means that are conventionally separately provided can be integrated. In the integrated CAM system, NC data can be obtained with which the CAM operation can be completed without requiring manual operations, determination of conditions can be completed in a remarkably reduced time, and an accurate and rapid machining can be realized.

The first invention further provides an integrated CAM system in which the dedicated interface interposed between the machining planning means and the NC data generating means includes information regarding approaching and retracting. With this structure, the NC data can be generated that effectively utilizes information such as conditions relating the path and speed of an approaching transfer from the machining start position or a temporary bypass position to an actually machined position and a retracting transfer from the actually machined position to the temporary bypass position or the machining terminate position. As a result, a further practical integrated CAM system can be provided.

The first invention further provides an integrated CAM system in which the dedicated interface interposed between the NC data generating means and the NC data verifying and editing means includes information regarding conditions, containing simulation accuracy, under which simulation is implemented. With this structure, simulation conditions can be effectively provided to the NC data verifying and editing means and thus a further practical integrated CAM system can be provided.

The first invention further provides an integrated CAM system in which any one of the NC data generating means, the NC data verifying and editing means and the NC data outputting means includes an NC data converting means that converts NC data of a format particular to the NC data generating means into NC data of a predetermined format with which an NC machine can operate. Accordingly, the number of degrees of freedom in the place at which the function of converting the NC data is provided increases, and thus a flexible system can be realized.

A second invention provides an integrated CAM system comprising: a shape input means that inputs a shape of a work piece; a machining planning means that plans a machining method of the work piece; an NC data generating means that generates NC data used for machining the work piece; and an NC data output means that outputs the NC data, wherein the NC data is integrally generated based on shape data of a work piece as the work piece successively passes through these means.

Here, an integrated CAM system in which the machining planning means that plans a machining method includes a process determining means that determines processes in consideration of minimum machining cost, and a machining condition determining means that determines, for each determined process, tooling conditions, tool movement conditions suitable for the process, and cutting conditions suitable for the process. With this structure, the machining planning can be automated without requiring cogitation of an operator and can be completed with fewer numbers of man-hour and in a reduced lead time. In the integrated CAM system, machine design information can be obtained with which, because the machining accuracy is improved by setting the cutting conditions in accordance with the tooling, determination of the condition can be completed in a remarkably reduced time, and an accurate and rapid machining can be realized.

The second invention further provides an integrated CAM system in which the machining planning means includes a machining information database that contains a rule for determining a machining mode, a rule for determining cutting conditions and/or data for computing machining capabilities. With the machining information database, practical machining planning information in light of historical performance can be obtained and a further practical machining planning can be realized.

The second invention further provides an integrated CAM system in which the NC data generating means that generates NC data includes a tool path computing means which considers tooling interference, uncut areas in a previous process, and overlap with a tool path of the previous process, or considers uncut areas in the previous process and overlap with the tool path of the previous process. With the tool path computing means, because the integrated CAM system obtains NC data based on an efficient tool path, determination of the condition can be completed in a remarkably reduced time and accurate and rapid machining can be realized.

The second invention further provides an integrated CAM system in which machining area data generated by the machining planning means is fed to the NC data generating means, and thus the tool path computing means in the NC data generating means can devoid of a tool path computing function in consideration of interference in tooling. In the integrated CAM system, NC data can be obtained with which, even when the NC data generating means has a reduced function, determination of conditions can be completed in a remarkably reduced time and an accurate and rapid machining can be realized.

The second invention further provides an integrated CAM system in which a dedicated interface is interposed between the machining planning means and the NC data generating means. With this structure, the machining planning means and the NC data generating means that are conventionally separately provided can be integrated. In the integrated CAM system, NC data can be obtained with which the CAM operation can be completed without requiring manual operations, determination of conditions can be completed in a remarkably reduced time, and an accurate and rapid machining can be realized.

The second invention further provides an integrated CAM system in which the dedicated interface interposed between the machining planning means and the NC data generating means includes information regarding approaching and retracting. With this structure, the NC data can be generated that effectively utilizes information such as conditions relating the path and speed of an approaching transfer from the machining start position or a temporary bypass position to an actually machined position and a retracting transfer from the actually machined position to the temporary bypass position or the machining terminate position. As a result, a further practical integrated CAM system can be provided.

The second invention further provides an integrated CAM system in which either of the NC data generating means or the NC data outputting means includes an NC data converting means that converts NC data of a format particular to the NC data generating means into NC data of a predetermined format with which an NC machine can operate. Accordingly, because the function of converting NC data can be selectively provided to either of the NC data generating means or the NC data outputting means, the number of degrees of freedom in the place at which the function of converting the NC data is provided increases, and thus a flexible system can be realized.

A third invention is a method of integrally generating NC data, the method comprising the steps of: inputting a shape of a work piece; planning a method of machining the work piece; generating NC data used for machining the work piece; verifying and editing the NC data; and outputting the NC data, wherein the NC data of high quality is integrally generated based on shape data of the product as the product successively passes through these steps. With the method of integrally generating NC data of the third invention, because the CAM operation can be completed without requiring manual operations in determining cutting conditions and the like, and NC data of extremely high quality can be stably obtained, determination of conditions can be completed in a remarkably reduced time. Further, a work piece having complex profile that conventionally required a number of manual operations can be accurately and rapidly machined with fewer number of man-hour and in a reduced lead time, and the problem of lack of skilled operators can also be resolved.

The third invention further provides a method of integrally generating NC data in which the step of planning a method of machining includes the steps of: determining processes in consideration of minimum machining cost; and determining, for each determined process, tooling conditions, tool movement conditions suitable for the process, and cutting conditions suitable for the process. In this method, the machining planning can be automated without requiring cogitation of an operator and can be completed with fewer numbers of man-hour and in a reduced lead time. In this method of integrally generating NC data, machine design information can be obtained with which, because the machining accuracy is improved by setting the cutting conditions in accordance with the tooling, an accurate and rapid machining can be realized.

The third invention further provides a method of integrally generating NC data in which the step of planning a method of machining plans the method of machining using a rule for determining machining mode, a rule for determining cutting conditions and/or data for computing machining capabilities. Accordingly, practical machining planning information in light of historical performance can be obtained and a further practical machining planning can be realized.

The third invention further provides a method of integrally generating NC data in which the step of generating NC data includes a step of computing a tool path which computes a tool path by considering tooling interference, uncut areas in a previous process, and overlap with a tool path of the previous process, or by considering uncut areas in the previous process and overlap with the tool path of the previous process. Accordingly, the NC data can be integrally generated with which, the NC data based on an efficient tool path can be obtained, determination of the condition can be completed in a remarkably reduced time and accurate and rapid machining can be realized.

The third invention further provides a method of integrally generating NC data in which machining area data generated at the step of planning a method of machining is fed to the step of generating NC data, and thus the step of computing tool path in the step of generating NC data can devoid of a tool path computing function in consideration of interference in tooling. Accordingly, the NC data can be integrally generated with which, even when the NC data generating means has a reduced function, determination of conditions can be completed in a remarkably reduced time and an accurate and rapid machining can be realized.

The third invention further provides a method of integrally generating NC data in which the step of verifying and editing the NC data includes a step of verifying a cutting load and correcting a feed rate in accordance with the verified cutting load. With the step, a stable machining with appropriate load can be realized. The step of verifying and editing the NC data further includes a step of verifying insignificant emptily cutting portions and deleting NC data corresponding to the emptily cutting portions, and editing the NC data around the emptily cutting portions in consideration of the effects on machining. With the step, machining time can be minimized by eliminating emptily cutting portions. Accordingly, the third invention provides a method of integrally generating NC data with which the NC data can be generated that enables an accurate and rapid machining.

The third invention further provides a method of integrally generating NC data in which any one of the step of generating NC data, the step of verifying and editing NC data, or the step of outputting NC data includes a step of converting NC data of a format particular to the NC data generating means into NC data of a predetermined format with which an NC machine can operate. Accordingly, because the procedure of converting the NC data can be selectively conducted in any one of the step of generating NC data, the step of verifying and editing NC data, and the step of outputting NC data, which increases the number of degrees of freedom in the process system.

A fourth invention is a method of integrally generating NC data, the method comprising the steps of: inputting a shape of a work piece; planning a method of machining the work piece; generating NC data used for machining the work piece; and outputting the NC data, wherein the NC data of high quality is integrally generated based on shape data of a work piece as the work piece successively passes through these steps.

Here, a method of integrally generating NC data in which the step of planning a method of machining includes the steps of: determining processes in consideration of minimum machining cost; and determining, for each determined process, tooling conditions, tool movement conditions suitable for the process, and cutting conditions suitable for the process. In this method, the machining planning can be automated without requiring cogitation of an operator and can be completed with fewer numbers of man-hour and in a reduced lead time. In this method of integrally generating NC data, machine design information can be obtained with which, because the machining accuracy is improved and the condition can be determined in a remarkably reduced time by setting the cutting conditions in accordance with the tooling, an accurate and rapid machining can be realized.

The fourth invention further provides a method of integrally generating NC data in which the machining planning means plans the method of machining using a rule for determining machining mode, a rule for determining cutting conditions and/or data for computing machining capabilities. Accordingly, practical machining planning information in light of historical performance can be stably obtained and a further practical machining planning can be realized.

The fourth invention further provides a method of integrally generating NC data in which the step of generating NC data includes a step of computing a tool path which computes a tool path by considering tooling interference, uncut areas in a previous process, and overlap with a tool path of the previous process, or by considering uncut areas in the previous process and overlap with the tool path of the previous process. Accordingly, the NC data can be integrally generated with which, the NC data based on an efficient tool path can be obtained, determination of the condition can be completed in a remarkably reduced time and accurate and rapid machining can be realized.

The fourth invention further provides a method of integrally generating NC data in which machining area data generated at the step of planning a method of machining is fed to the step of generating NC data, and thus the step of computing tool path in the step of generating NC data can devoid of a tool path computing function in consideration of interference in tooling. Accordingly, the NC data can be integrally generated with which, even when the NC data generating means has a reduced function, determination of conditions can be completed in a remarkably reduced time and an accurate and rapid machining can be realized.

The fourth invention further provides a method of integrally generating NC data in which either of the step of generating NC data or the step of outputting NC data includes a step of converting NC data of a format particular to the NC data generating means into NC data of a predetermined format with which an NC machine can operate. Accordingly, because the procedure of converting the NC data can be selectively conducted in either of the step of generating NC data or the step of outputting NC data, which increases the number of degrees of freedom in the process system.

A fifth invention provides an integrated CAM system comprising: a shape input means that inputs a shape of a work piece; a machining planning means that plans a machining method of the work piece; an NC data generating means that generates NC data used for machining the work piece; an NC data verifying and editing means that verifies and edits the NC data; and an NC data output means that outputs the verified and edited NC data, wherein, as the work piece successively passes through these means, the NC data is integrally generated based on shape data of the work piece by: providing the shape data of the work piece from the shape input means to the machining planning means; providing the machining method of the work piece and machining conditions for each process from the machining planning means to the NC data generating means; providing unedited NC data of the work piece from the NC data generating means to the NC data verifying and editing means; and providing edited NC data used for actual machining of the work piece from the NC data verifying and editing means to the NC data output means. With this structure of integrally generating the NC data based on shape data of a work piece as the work piece successively passes through these means, the fifth invention attains the above-described object.

A sixth invention is a machining planning system that plans a method of machining the work piece for integrally generating NC data based on shape data of a work piece. The machining planning system comprises: a process determining means that determines processes in consideration of minimum machining cost; and a machining condition determining means that determines, for each determined process, tooling conditions, tool movement conditions suitable for the process, and cutting conditions suitable for the process. With this structure, the machining planning can be automated without requiring manual operation and can be completed with fewer numbers of man-hour and in a reduced lead time. Accordingly, because machining planning information of high quality is stably obtained, a machining planning system that is ready to solve the problem of lack of skilled operators can be provided.

A seventh invention is a machining planning system that plans a method of machining a work piece for integrally generating NC data based on shape data of the work piece. With the machining planning system, practical machining planning information in light of historical performance can be obtained by using a rule for determining machining mode, a rule for determining cutting conditions and/or data for computing machining capabilities. Accordingly, a machining planning suitable for integral generation of NC data can be realized.

An eighth invention comprises: a process determining means that determines an optimum combination of a plurality of processes for machining a material into an intended product shape and a tool profile of a tool used for machining the material in each process; and a tool movement mode generating means that generates a tool movement mode of a computer-aided manufacturing based on the process determined by the process determining means and the tool profile for each process.

In a ninth invention, a computer functions as: a process determining means that determines an optimum combination of a plurality of processes for machining a material into an intended product shape and a tool profile of a tool used for machining the material in each process; and a tool movement mode generating means that generates a tool movement mode of a computer-aided manufacturing based on the process determined by the process determining means and the tool profile for each process.

According to the eighth and ninth inventions, a simple rule can be established based on each process and each tool profile for machining a material. In this context, the term "product shape" includes the shape of a mold. A tool profile is preferably represented by a tool tip profile, tool diameter, and the like. A preferable apparatus for assisting a machine includes a means that generates NC data, such as a CAM. Using the above-described simple rule, a tool movement mode of the apparatus for assisting the machine can be generated easily.

The eighth invention is characterized in that the tool movement mode generating means includes: a process type data storing means that stores process type data used for determining a machining mode in accordance with a combination of the process and the tool profile; a machining mode determining means that determines a machining mode in accordance with the combination of the process determined by the process determining means and the tool profile for each process using the process type data stored in the process type data storing means; and a mode converting means that converts the machining mode determined by the machining mode determining means into a tool movement mode.

The ninth invention is characterized in that the tool movement mode generating means functions as: a process type data storing means that stores process type data used for determining a machining mode in accordance with a combination of the process and the tool profile; a machining mode determining means that determines a machining mode in accordance with the combination of the process determined by the process determining means and the tool profile for each process using the process type data stored in the process type data storing means; and a mode converting means that converts the machining mode determined by the machining mode determining means into a tool movement mode.

According to the eighth and ninth inventions, a machining mode to be outputted for a combination of a process and a tool profile is described in the process type data stored in the process type data storing means. The process is preferably represented by the order (number) of each process for machining a product shape. A tool profile is preferably represented by a tool tip profile, tool diameter, and the like. Thus, the process type data is formed by a simple rule of a machining mode in accordance with a combination of a process and a tool profile. Using the process type data, a machining mode corresponding to the combination of the process determined by the process determining means and a tool profile for each process, and a tool movement mode converted from the machining mode can be automatically determined.

The eighth invention is characterized in that the process type data storing means stores process type data used for determining a machining mode in accordance with a combination of a process and a tool profile of a tool having a ball-shaped tip profile.

The ninth invention is characterized in that the process type data storing means stores process type data used for determining a machining mode in accordance with a combination of a process and a tool profile of a tool having a ball-shaped tip profile.

According to the eighth and ninth inventions, because the process in accordance with a combination of a process and a tool profile of a tool having a ball-shaped tip profile is described in the process type data, a rule that includes a tool having a ball-shaped process tip profile and a process as a condition can be established. As a result, a practical machining mode for machining three-dimensional curved surface and a tool movement mode converted from the machining mode can be generated.

The eighth invention is characterized in that the mode converting means converts the machining mode determined by the machining mode determining means into the tool movement mode using a conversion table representing correspondence between each machining mode and the tool movement mode.

The ninth invention is characterized in that the mode converting means converts the machining mode determined by the machining mode determining means into the tool movement mode using a conversion table representing correspondence between each machining mode and the tool movement mode.

According to the eighth and ninth inventions, the machining mode determined by the machining mode determining means is converted into the tool movement mode using a conversion table representing correspondence between each machining mode and the tool movement mode. In this context, the term "tool movement mode" refers to a machining mode corresponding to the conventional CAM and, for example, an operating condition at which a tool of a machine is moved. Using the conversion table, data of general tool movement mode can be automatically generated from the machining mode.

A tenth invention comprises: a process determining means that determines a plurality of processes for machining a material into an intended product shape and machining capabilities of each process; a cutting conditions adjusting data storing means that stores, for each product type, cutting conditions adjusting data used for adjusting the machining capabilities by dividing the machining capabilities into predetermined directions at the time of cutting; and a cutting conditions generating means that reads out cutting conditions adjusting data corresponding to the product type to be machined from the cutting conditions adjusting data storing means and generates cutting conditions by dividing the machining capabilities of each process determined by the process determining means into the predetermined directions based on the read cutting conditions adjusting data.

In an eleventh invention, a computer functions as: a process determining means that determines a plurality of processes for machining a material into an intended product shape and machining capabilities of each process; a cutting conditions adjusting data storing means that stores, for each product type, cutting conditions adjusting data used for adjusting the machining capabilities by dividing the machining capabilities into predetermined directions at the time of cutting; and a cutting conditions generating means that reads out cutting conditions adjusting data corresponding to the product type to be machined from the cutting conditions adjusting data storing means and generates cutting conditions by dividing the machining capabilities of each process determined by the process determining means into the predetermined directions based on the read cutting conditions adjusting data.

According to the tenth and eleventh inventions, the cutting conditions adjusting data representing the manner in which the machining capabilities is divided into predetermined directions at the time of cutting is stored in the cutting conditions adjusting data stored in the cutting conditions adjusting data storing means. The cutting conditions adjusting data is previously determined based on the expertise in the machining field. By dividing the machining capabilities of each process determined by the process determining means into predetermined directions based on the cutting conditions adjusting data, cutting conditions can be automatically determined in accordance with actuality in the machining field.

The tenth invention is characterized in that the cutting conditions adjusting data storing means stores, for each product type, cutting conditions adjusting data for adjusting machining capabilities at the time of cutting by dividing the machining capabilities in a predetermined ratio for each one or more stages with respect to a depth of cut in an axial direction of the tool, a depth of cut in a radial direction of the tool and a feed rate; and the cutting conditions generating means generates cutting conditions by dividing, based on the read cutting conditions adjusting data, the machining capabilities of each process determined by the process determining means in a predetermined ratio with respect to the depth of cut in the axial direction of the tool, the depth of cut in the radial direction of the tool and the feed rate.

The eleventh invention is characterized in that the cutting conditions adjusting data storing means stores, for each product type, cutting conditions adjusting data for adjusting machining capabilities at the time of cutting by dividing the machining capabilities in a predetermined ratio for each one or more stages with respect to a depth of cut in an axial direction of the tool, a depth of cut in a radial direction of the tool and a feed rate; and the cutting conditions generating means generates cutting conditions by dividing, based on the read cutting conditions adjusting data, the machining capabilities of each process determined by the process determining means in a predetermined ratio with respect to the depth of cut in the axial direction of the tool, the depth of cut in the radial direction of the tool and the feed rate.

According to the tenth and eleventh inventions, the cutting conditions adjusting data further describes that the machining capabilities at the time of cutting is divided in a predetermined ratio for each one or more stages with respect to the depth of cut in an axial direction of the tool, the depth of cut in a radial direction of the tool and the feed rate. For some types of tools, pick field amount may by used instead of the depth of cut in the radial direction. By dividing the machining capabilities in a predetermined ratio for each one or more stages with respect to the depth of cut in the axial direction of the tool, the depth of cut in the radial direction of the tool and the feed rate, each cutting condition with respect to the depth of cut in the axial direction of the tool, the depth of cut in the radial direction of the tool and thee feed rate can be automatically determined using the cutting conditions adjusting data based on the expertise in the machining field.

The tenth invention is characterized in that the cutting conditions adjusting data storing means stores, for each product type, cutting conditions adjusting data that describes, for each stage, a lower limit value representing that each cutting condition with respect to the depth of cut in the axial direction of the tool, the depth of cut in the radial direction of the tool and the feed rate is saturated; and when at least one of the cutting conditions with respect to the depth of cut in the axial direction of the tool, the depth of cut in the radial direction of the tool and the feed rate is saturated, the cutting conditions generating means generates cutting conditions by dividing the machining capabilities in a predetermined ratio of a next stage with respect to the depth of cut in the axial direction of the tool, the depth of cut in the radial direction of the tool and the feed rate.

The eleventh invention is characterized in that the cutting conditions adjusting data storing means stores, for each product type, cutting conditions adjusting data that describes, for each stage, a lower limit value representing that each cutting condition with respect to the depth of cut in the axial direction of the tool, the depth of cut in the radial direction of the tool and the feed rate is saturated; and when at least one of the cutting conditions with respect to the depth of cut in the axial direction of the tool, the depth of cut in the radial direction of the tool and the feed rate is saturated, the cutting conditions generating means generates cutting conditions by dividing the machining capabilities in a predetermined ratio of a next stage with respect to the depth of cut in the axial direction of the tool, the depth of cut in the radial direction of the tool and the feed rate.

According to the tenth and eleventh inventions, the cutting conditions adjusting data further describes, for each stage, a lower limit value representing that each cutting condition with respect to the depth of cut in the axial direction of the tool, the depth of cut in the radial direction of the tool and the feed rate is saturated. When at least one of the cutting conditions with respect to the depth of cut in the axial direction of the tool, the depth of cut in the radial direction of the tool and the feed rate is saturated, the machining capabilities is divided in a predetermined ratio of a next stage with respect to the depth of cut in the axial direction of the tool, the depth of cut in the radial direction of the tool and the feed rate. Here, the saturated cutting condition is preferably set to the lower limit value. As a result, when the machining capabilities varies as the process advances, machining capabilities is re-divided using the cutting conditions adjusting data based on the expertise in the machining field, and thus efficient machining is realized.

A twelfth invention comprises: a machining coordinate system data storing means that stores, for each product type, machining coordination data including at least one of a machining start position representing an original position of the tool of the machine, a tool movement start position representing a position at which the tool begins to be moved, and a free movement area representing an area in which the tool can be freely moved; and a tool position data generating means that generates tool position data for specifying at least one of the machining start position representing the original position of the tool of the machine, the tool movement start position and the free movement area used for machining an intended mold shape by reading out, from the machining coordinate system data storing means, and utilizing the machining coordinate system data in accordance with the intended product type.

In a thirteenth invention, a computer functions as: a machining coordinate system data storing means that stores, for each product type, machining coordination data including at least one of a machining start position representing an original position of the tool of the machine, a tool movement start position representing a position at which the tool begins to be moved, and a free movement area representing an area in which the tool can be freely moved; and a tool position data generating means that generates tool position data for specifying at least one of the machining start position representing the original position of the tool of the machine, the tool movement start position and the free movement area used for machining an intended mold shape by reading out, from the machining coordinate system data storing means, and utilizing the machining coordinate system data in accordance with the intended product type.

According to the twelfth and thirteenth inventions, the machining coordinate system data describes at least one of the machining start position representing the original position of the tool of the machine, the tool movement start position representing the position at which the tool begins to be moved, and the free movement area representing an area in which the tool can be freely moved. The machining start position is preferably set to the minimum or maximum value of each X, Y and Z axis on a product reference surface. The free movement area is an area in which the tool can be freely and rapidly moved, and is preferably provided at one side of the X, Y and Z surfaces. By generating tool position data that specifies at least one of the machining start position representing the original position of the tool of the machine, the tool movement start position and the free movement area using the coordination system data in accordance with the intended product type, pre-operations for controlling the machine can be automatically conducted.

A fourteenth invention comprises: a tool operation information storing means that stores, for each product type and for each tool movement mode corresponding to an apparatus for assisting a machine, tool operation information including at least one of approach tool operation information representing conditions under which a tool approaches the cutting start position, and retraction tool operation information representing conditions under which a tool moves away from a cutting end position; and a tool operation information generating means that generates at least one of the approach tool operation information and the retraction tool operation information, by reading out the tool operation information which corresponds to the product type to be machined and the tool movement mode used for machining the product type, and generating at least one of the approach tool operation information and the retraction tool operation information using the read tool operation information.

In a fifteenth invention, a computer functions as: a tool operation information storing means that stores, for each product type and for each tool movement mode corresponding to an apparatus for assisting a machine, tool operation information including at least one of approach tool operation information representing conditions under which a tool approaches the cutting start position, and retraction tool operation information representing conditions under which a tool moves away from a cutting end position; and a tool operation information generating means that generates at least one of the approach tool operation information and the retraction tool operation information, by reading out the tool operation information which corresponds to the product type to be machined and the tool movement mode used for machining the product type, and generating at least one of the approach tool operation information and the retraction tool operation information using the read tool operation information.

According to the fourteenth and fifteenth inventions, the tool operation information exists for each product type and for each tool movement mode in accordance with the apparatus for assisting the machine. The tool operation information further includes at least one of the approach tool operation information representing conditions under which the tool approaches the cutting start position, and the retraction tool operation information representing conditions under which the tool moves away from the cutting end position. The approach tool operation information is preferably represented by a value representing an operation of the tool moving toward the initial cutting command position, i.e., the distance that the tool is rapidly moved upward from the initial cutting command position, and a value representing the position above the initial cutting command position at which the tool begins approach operation. The retraction tool operation information is preferably represented by a value representing the distance that the tool is rapidly moved upward from the last cutting command position. Then, at least one of the approach tool operation information and the retraction tool operation information of the tool movement mode used for machining the product shape is generated using the tool operation information in accordance with the intended product type and the tool movement mode for machining the product type. Because the tool operation information at the time of approaching and retracting is generated in this manner, troubles such as breakage of the tool caused during machining can be prevented and pre-operations for control of the machine can be automatically conducted.

BRIEF DESCRIPTION OF THE DRAWINGS

FIG. 2 is a flow chart which shows a method of integrally generating NC data of the present invention.

FIG. 10 is a chart showing a product type code for each product type.

FIG. 11 is a chart showing an exemplary process model.

FIG. 12 is a chart showing process type codes.

FIG. 13 is a chart showing material codes.

FIG. 14 is a chart showing machining mode converting codes.

FIG. 15 is a chart showing cutting conditions adjusting codes.

FIG. 18 is a chart which shows structures of process types.

FIG. 19 is a chart which shows machining modes.

FIG. 20 is a chart which explains output contents with respect to inputs of the conditions 1 through 13 of the process type.

FIG. 21 is a chart which shows a structure of machining mode converting data.

FIG. 22 is a chart which explains the meaning of the machining mode converting data.

FIG. 23 is a chart which shows CAM machining mode codes.

FIG. 24 is a chart which shows structures of cutting conditions adjusting codes.

FIG. 30 is a chart showing a structure of machining coordinate system data.

FIG. 31 is a chart showing a structure of tool operation information.

BEST MODES FOR IMPLEMENTING THE INVENTION

Figure 1:
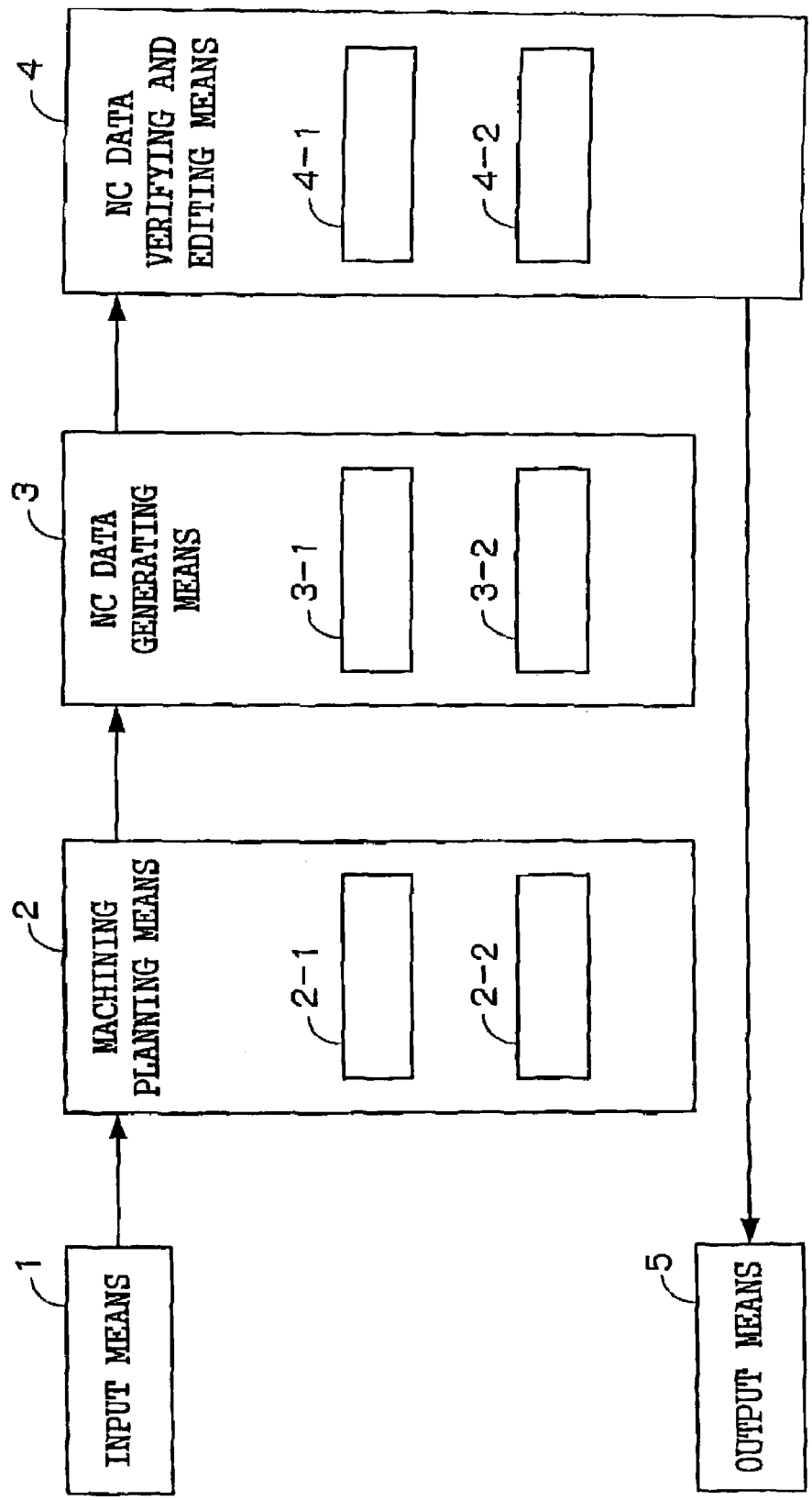
FIG. 1 is a conceptual view of an integrated CAM system of the present invention.

Referring now to the drawings, embodiments of an integrated CAM system, a method of integrally generating NC data and a machining planning system relating to the present invention will be described.

FIG. 1 is a conceptual view of an integrated CAM system of the present invention.

In FIG. 1, the reference numeral 1 denotes an input means that inputs shape data of a work piece.

The reference numeral 2 denotes a machining planning means that plans a method of machining the work piece using the shape data of the work piece inputted from the input means 1 and data stored in a database such as a process model, process type, a list of tools of normal use, a list of combination of holders of normal use, and a list of machine of normal use. The machining planning means 2 includes a process determining means 2-1 for determining processes in consideration of minimum machining cost, and a machining condition determining means 2-2 for determining, for each determined process, tooling conditions, tool movement conditions suitable for the process, and cutting conditions suitable for the process.

The reference numeral 3 denotes an NC data generating means that generates, based on the design data designed by the machining planning means, NC data used for machining the work piece. The NC data generating means includes a tool path computing means 3-1 which computes a tool path in consideration of tooling interference, uncut area in a previous process, and overlap with a tool path of the previous process.

The reference numeral 4 denotes an NC data verifying and editing means that verifying and editing the NC data generated in the NC data generating means. The NC data verifying and editing means includes: a feed rate correcting means 4-1 that verifies a cutting load and corrects a feed rate in accordance with the verified cutting load; and an NC data deleting and editing means 4-2 for emptily cutting portions that verifies insignificant emptily cutting portions and deletes NC data corresponding to the emptily cutting portions, and edits the NC data around the emptily cutting portions in consideration of the effects on machining.

The reference numeral 5 denotes an output means that outputs the NC data from the NC data verifying and editing means to an NC machine or to a dedicated personal computer, which is provided between NC machines or the like.

Figure 2:
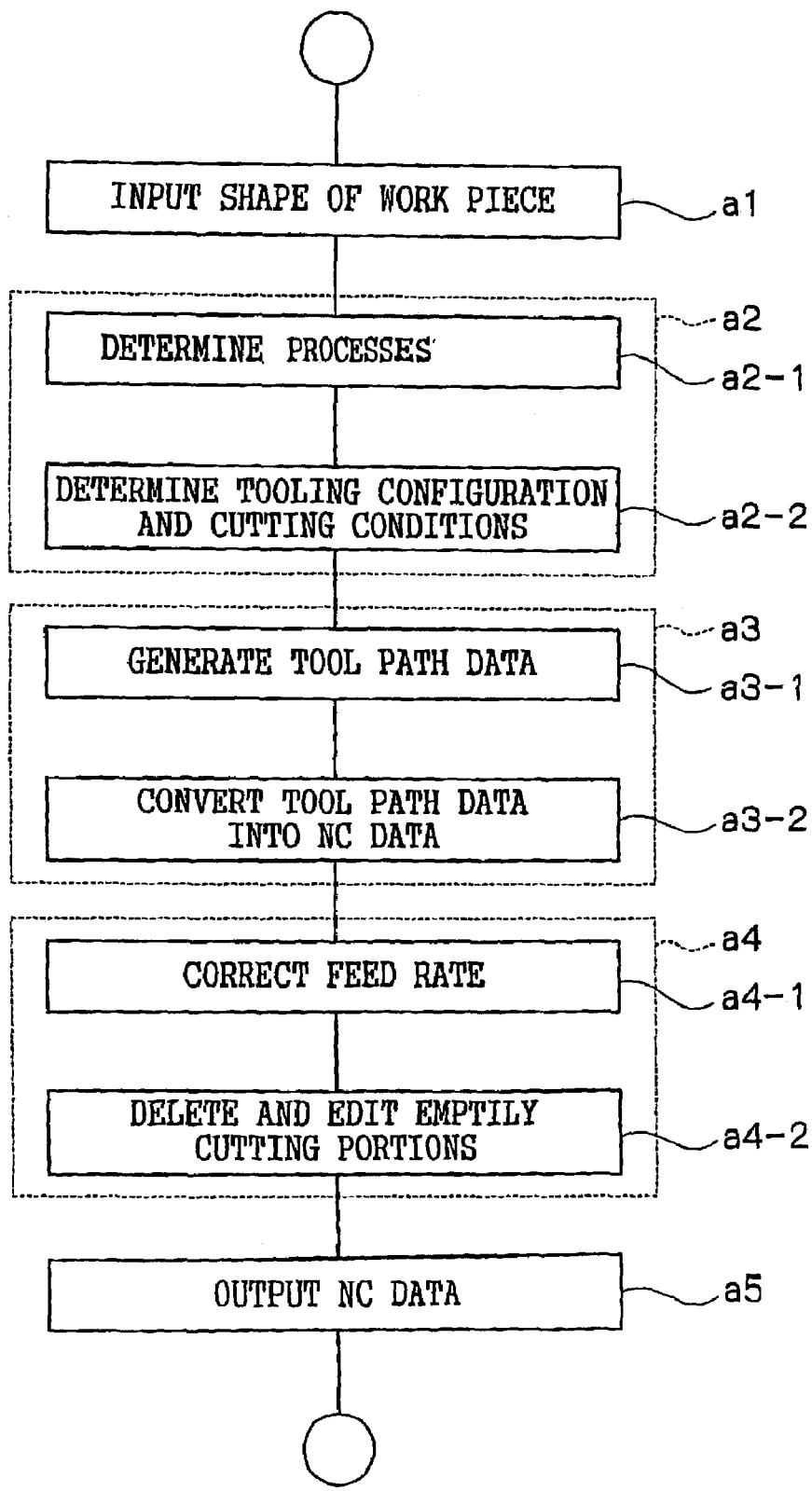
FIG. 2 is a flow chart which shows a method of integrally

In FIG. 2, the NC data generating means 3 includes an NC data converting means 3-2 that converts NC data of a format particular to the NC data generating means into NC data of a predetermined format with which an NC machine can operate. However, it is evident from the function of the NC data converting means that the NC data converting means may be included in any one of the NC data generating means 3, the NC data verifying and editing means 4 and the NC data output means 5.

FIG. 2 is a flow chart which shows a method of integrally generating NC data of the present invention.

In FIG. 2, the reference numeral a1 denotes a step of inputting the shape data of a work piece.

The reference numeral a2 denotes a step of planning a method of machining the work piece using the shape data of the work piece inputted by the input means 1 and data stored in a database such as a process model, process type, a list of tools of normal use, a list of combination of holders of normal use, and a list of machine of normal use. The step a2 of planning a method of machining includes: a step a2-1 of determining processes in consideration of minimum machining cost; and a step a2-2 of determining, for each determined process, tooling conditions, tool movement conditions suitable for the process, and cutting conditions suitable for the process in consideration of interference and rigidity.

The reference numeral a3 denotes a step of generating, based on the design data designed by the machining planning means, NC data used for machining the work piece. The step of generating NC data includes a step a3-1 of computing a tool path which computes a tool path by considering tooling interference, uncut area in a previous process, and overlap with a tool path of the previous process.

The reference numeral a4 denotes a step of verifying and editing the NC data generated in the step of generating NC data. The step of verifying and editing the NC data includes: a step a4-1 of verifying a cutting load and correcting a feed rate in accordance with the verified cutting load; and a step a4-2 of verifying insignificant emptily cutting portions and deleting NC data corresponding to the emptily cutting portions, and editing the NC data around the emptily cutting portions in consideration of the effects on machining.

The reference numeral a5 denotes a step of outputting the NC data from the NC data verifying and editing means to an NC machine or to a dedicated personal computer, which is provided between NC machines or the like.

In FIG. 2, the step a3 of generating NC data includes a step a3-2 of converting NC data for converting NC data of a format particular to the NC data generating means into NC data of a predetermined format with which an NC machine can operate. However, it is evident from the function of the step of converting NC data that the step of converting NC data may be included in any one of the step a3 of generating NC data, the step a4 of verifying and editing NC data and the step a5 of outputting NC data.

First Embodiment

Next, referring to FIG. 3, which is a concretized view of the conceptual view of FIG. 1, a first embodiment will be described.

Figure 3:
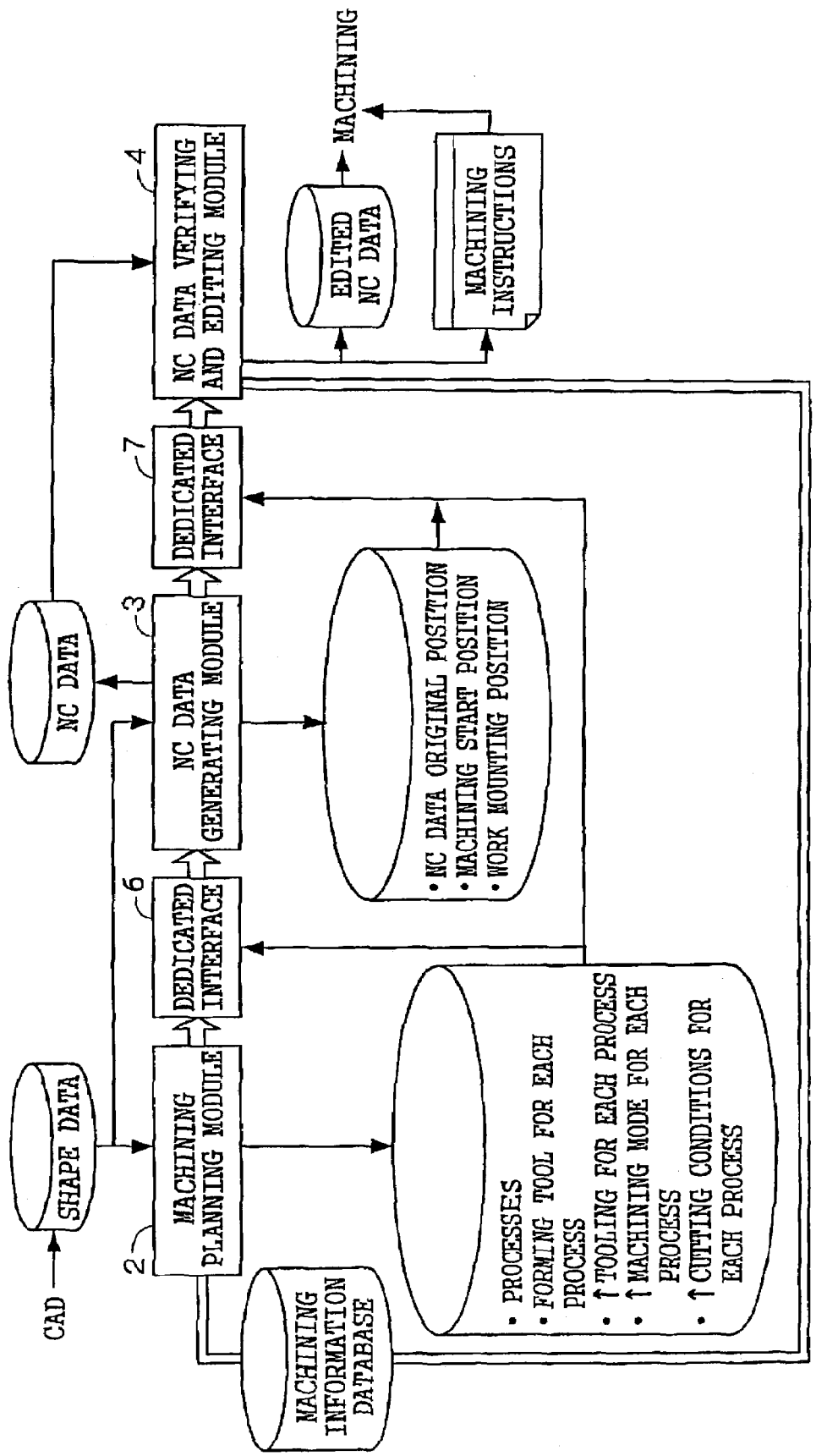
FIG. 3 is a drawing which shows a first embodiment of the present invention.

In the first embodiment shown in FIG. 3, the reference numeral 2 denotes a machining planning module, which corresponds to the machining planning means 2 in FIG. 1, the reference numeral 3 denotes an NC data generating module, which corresponds to the NC data generating means 3 in FIG. 1, and the reference numeral 4 denotes an NC data verifying and editing module, which corresponds to the NC data verifying and editing means 4 in FIG. 1.

These three modules are connected to each other such that the machining planning module 2 and the NC data generating module 3 are connected to each other by a dedicated interface 6, and the NC data generating module 3 and the NC data verifying and editing module 4 are connected to each other by a dedicated interface 7.

The dedicated interface 6 has a function to convert the information that is outputted from the machining planning module into the information that can be input into the NC data generating module, and a function to add information such as machining coordinate system, information regarding approaching and retracting, and the like.

The dedicated interface 7 has a function to convert the information that is outputted from the NC data generating module into the information that can be input into the NC data verifying and editing module, and a function to add information such as machining clamp, and the like.

Second Embodiment

Figure 4:
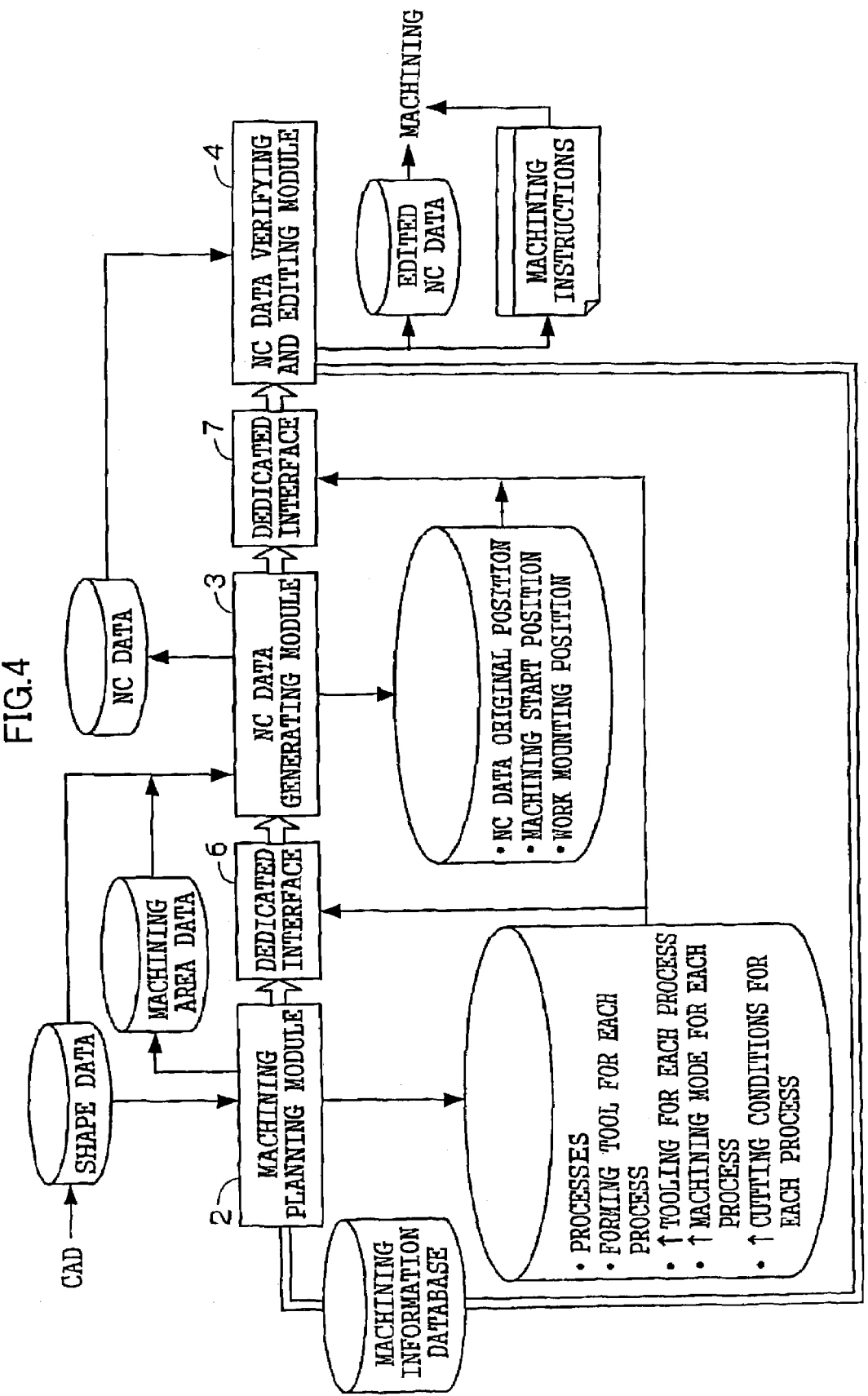
FIG. 4 is a drawing which shows a second embodiment of the present invention.

Next, referring to FIG. 4, a second embodiment will be described. FIG. 4 shows a modified embodiment of FIG. 3, which is a concretized view of the conceptual view of FIG. 1.

In the second embodiment shown in FIG. 4, the reference numeral 2 denotes a machining planning module, which corresponds to the machining planning means 2 in FIG. 1, the reference numeral 3 denotes an NC data generating module, which corresponds to the NC data generating means 3 in FIG. 1, and the reference numeral 4 denotes an NC data verifying and editing module, which corresponds to the NC data verifying and editing means 4 in FIG. 1.

These three modules are connected to each other such that the machining planning module 2 and the NC data generating module 3 are connected to each other by a dedicated interface 6, and the NC data generating module 3 and the NC data verifying and editing module 4 are connected to each other by a dedicated interface 7.

The dedicated interface 6 has a function to convert the information that is outputted from the machining planning module into the information that can be input into the NC data generating module, and a function to add information such as machining coordinate system, information regarding approaching and retracting, and the like.

The dedicated interface 7 has a function to convert the information that is outputted from the NC data generating module into the information that can be input into the NC data verifying and editing module, and a function to add information such as machining clamp, and the like.

The second embodiment shown in FIG. 4 is characterized in that the second embodiment is devoid of the "tool path computing function considering the tooling interference" that is implemented in the NC data generating module in the first embodiment shown in FIG. 3. For compensating this function, by feeding the "machining area data" generated in the machining planning module 2 to the NC data generating module, the "tool path computing function considering the tooling interference" in the NC data generating module 3 becomes unnecessary. Safety in this case is insured by provision of a verifying means that verifies the interference in tooling with respect to the approach and retract path in the NC data verifying and editing module.

Regarding paths other than the approach and retract path (i.e., paths within the machining area fed from the machining planning module), verification is unnecessary because the machining planning module decides tooling that is free of interference.

Third Embodiment

Figure 5:
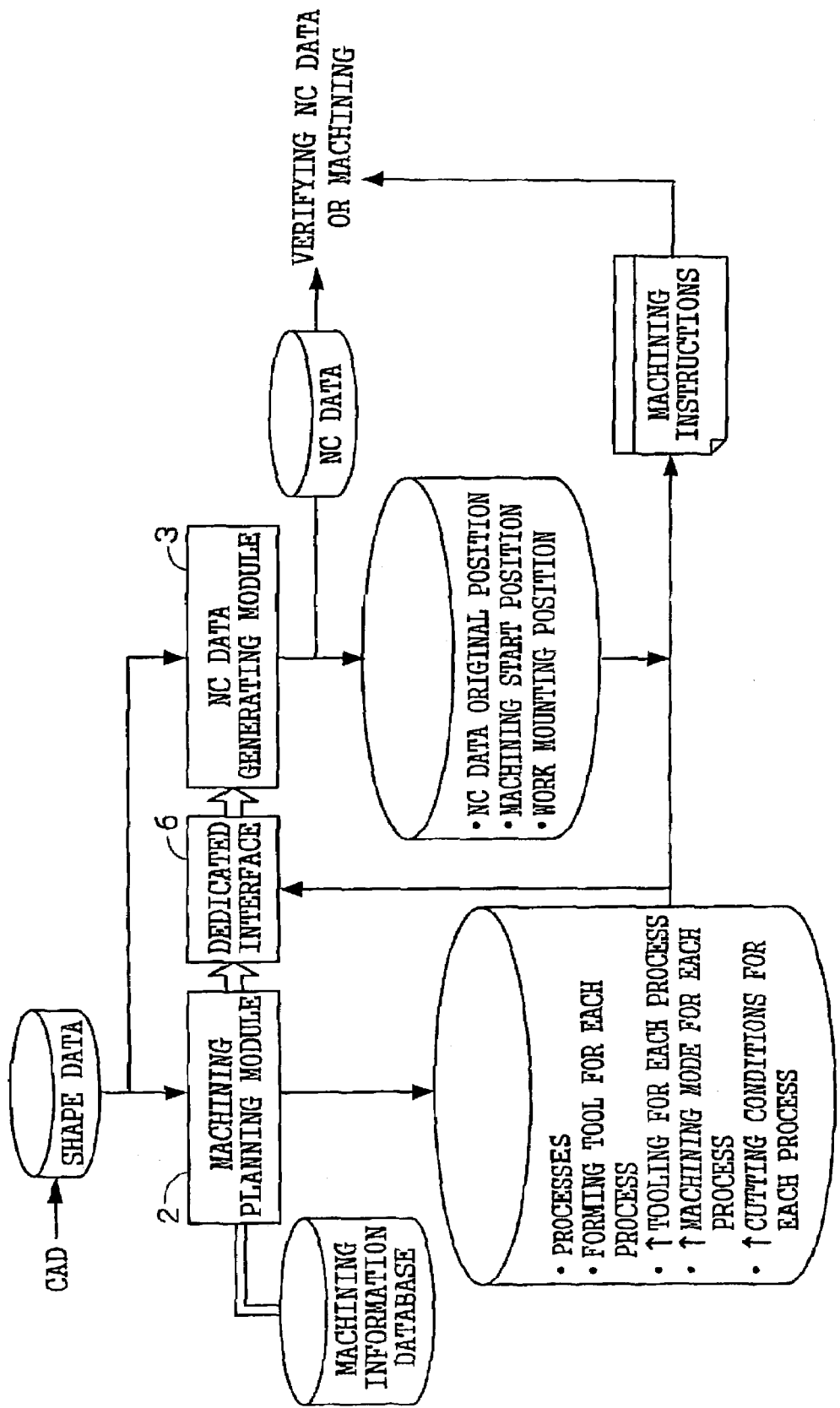
FIG. 5 is a drawing which shows a third embodiment of the present invention.

Next, referring to FIG. 5, a third embodiment will be described. FIG. 5 shows another modified embodiment of FIG. 3, which is a concretized view of the conceptual view of FIG. 1.

In the third embodiment shown in FIG. 5, the reference numeral 2 denotes a machining planning module, which corresponds to the machining planning means 2 in FIG. 1, and the reference numeral 3 denotes an NC data generating module, which corresponds to the NC data generating means 3 in FIG. 1.

The machining planning module 2 and the NC data generating module 3 are connected to each other by a dedicated interface 6.

The dedicated interface 6 has a function to convert the information that is outputted from the machining planning module into the information that can be input into the NC data generating module, and a function to add information such as machining coordinate system, information regarding approaching and retracting, and the like.

The third embodiment is characterized in that the NC data outputted from the NC data generating module is the final output of the system and the NC data can be directly input into the NC machine or can be input into another apparatus that has a function to verify and edit the NC data.

Fourth Embodiment

Figure 6:
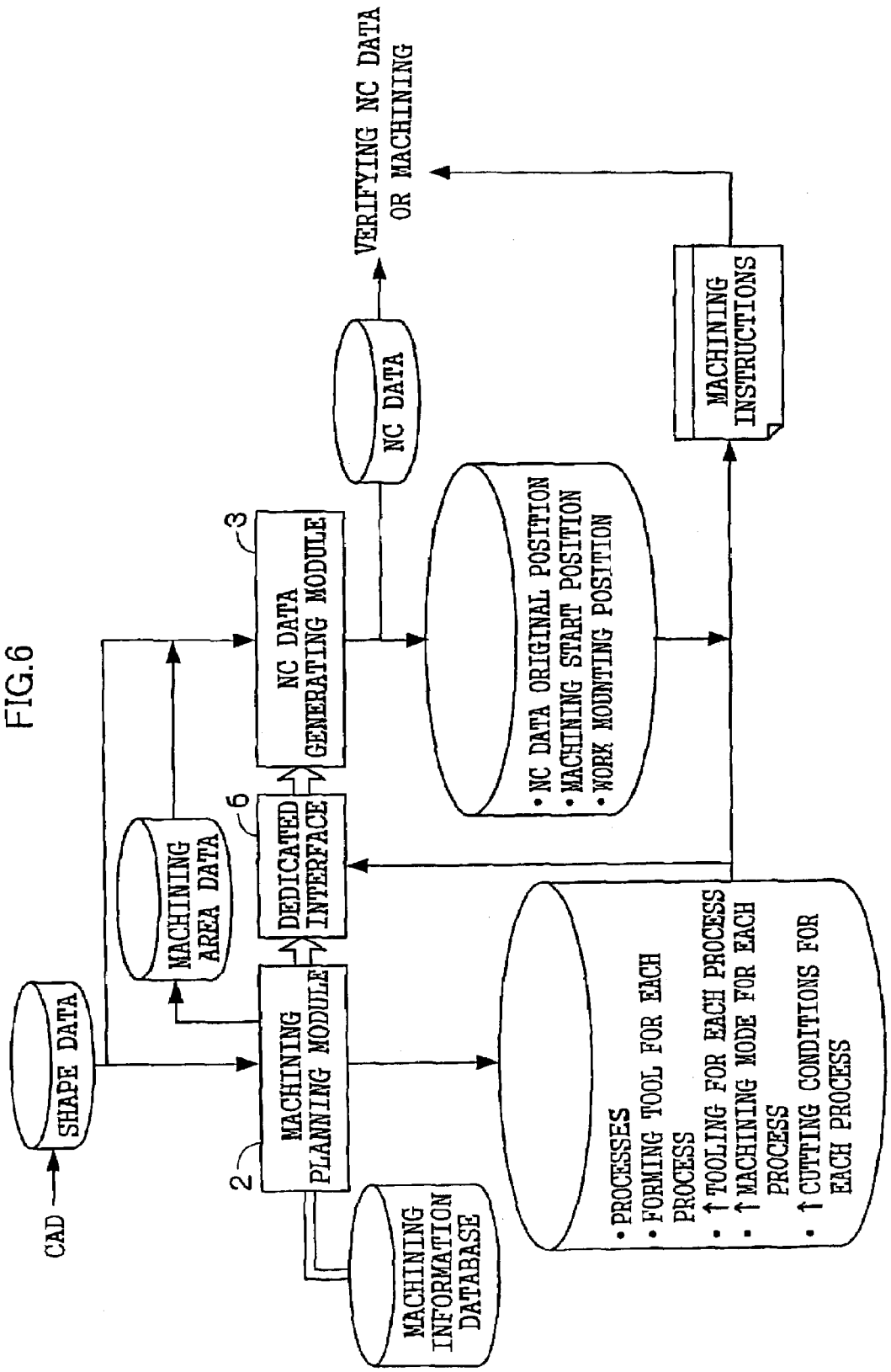
FIG. 6 is a drawing which shows a fourth embodiment of the present invention.

Next, referring to FIG. 6, a fourth embodiment will be described. FIG. 6 shows another modified embodiment of FIG. 3, which is a concretized view of the conceptual view of FIG. 1.

In the fourth embodiment shown in FIG. 6, the reference numeral 2 denotes a machining planning module, which corresponds to the machining planning means 2 in FIG. 1, and the reference numeral 3 denotes an NC data generating module, which corresponds to the NC data generating means 3 in FIG. 1.

The machining planning module 2 and the NC data generating module 3 are connected to each other by a dedicated interface 6.

The dedicated interface 6 has a function to convert the information that is outputted from the machining planning module into the information that can be input into the NC data generating module, and a function to add information such as machining coordinate system, information regarding approaching and retracting, and the like.

The fourth embodiment shown in FIG. 6 is characterized in that the fourth embodiment is devoid of the "tool path computing function considering the tooling interference" that is implemented in the NC data generating module in the third embodiment shown in FIG. 5. For compensating this function, by feeding the "machining area data." generated in the machining planning module 2 to the NC data generating module, the "tool path computing function considering the tooling interference" in the NC data generating module 3 becomes unnecessary. Safety in this case is insured by provision of a verifying means that verifies the interference in tooling with respect to the approach and retract path in the NC data verifying and editing module.

Regarding paths other than the approach and retract path (i.e., paths within the machining area fed from the machining planning module), verification is unnecessary because the machining planning module decides tooling that is free of interference.

Further, the NC data outputted from the NC data generating module is the final output of the system and the NC data can be directly input into the NC machine or can be input into another apparatus that has a function to verify and edit the NC data.

EXAMPLES

Figure 7:
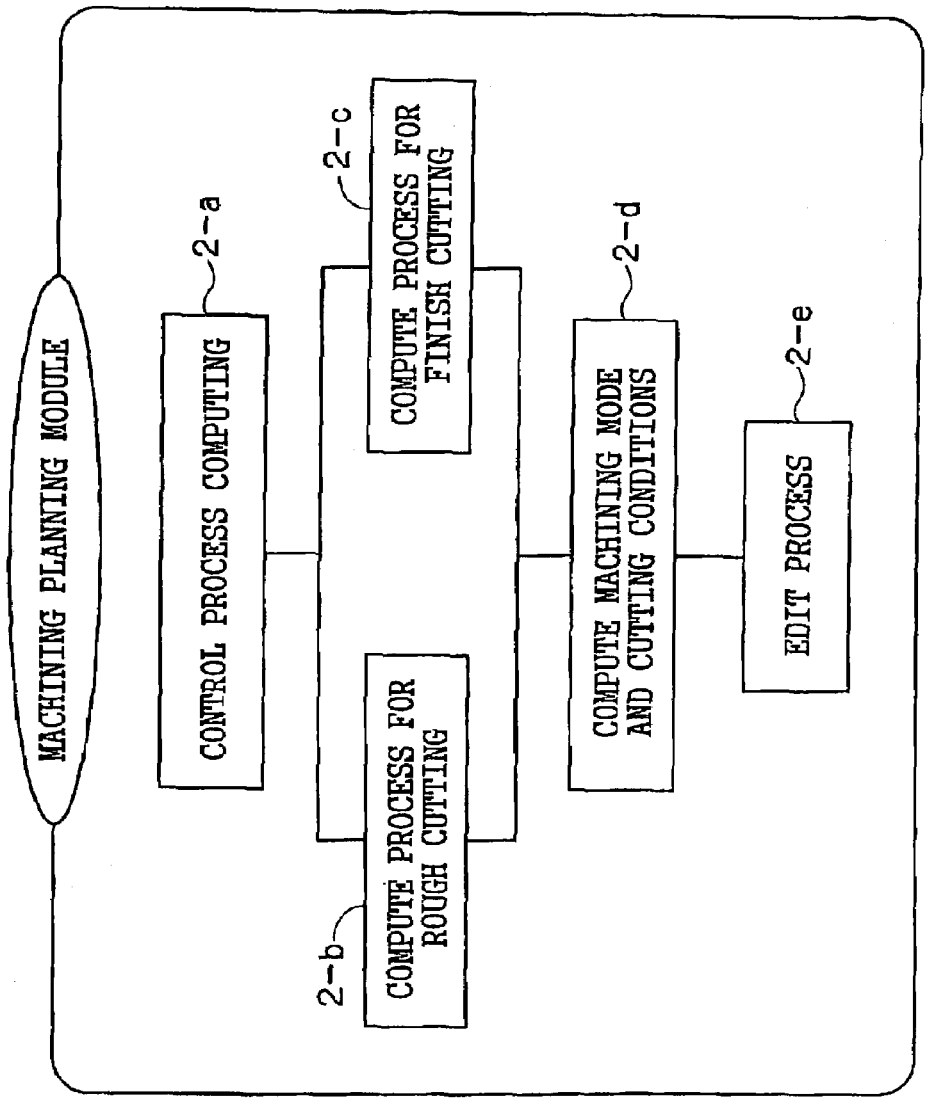
FIG. 7 is a detail drawing which shows a structure of a machining planning module.

Referring to FIG. 7, the machining planning module, which is a component of the present invention, will be described in detail.

FIG. 7 is a detail drawing which shows a structure of a machining planning module. In FIG. 7, the reference numeral 2-*a* denotes a process computing control section that inputs process models each describing computing condition for each of the process when the process is divided into rough cutting and finish cutting, and then divides the process computation into a process computing section for rough cutting and to a process computing section for finish cutting. The reference numeral 2-*b* denotes the process computing section for rough cutting, which determines a process on the basis of a machining volume as the machining capabilities of a tool, and computes the tooling for each process and the machining capabilities in accordance with the tooling based on the computed data of machining capabilities, and the like. The reference numeral 2-*c* denotes the process computing section for finish cutting, which determines a process on the basis of a machining area as the machining capabilities of a tool, and determines the tooling for each process and the machining capabilities in accordance with the tooling. The reference numeral 2-*d* denotes a machining mode and cutting conditions computing section, which determines a machining mode for the process computed at the process computing section 2-*b* or 2-*c*, with reference to a rule for determining a machining mode registered separately in a machining information DB (database). Further, the machining mode and cutting conditions computing section 2-*d* determines cutting conditions based on the machining capabilities of each process computed at the process computing section 2-*b* or 2-*c* with reference to a rule for determining cutting conditions registered separately in a machining information DB. The reference numeral 2-*e* denotes a process editing section, which determines a series of processes for the work piece by integrating the results obtained from the process computation for rough cutting and finish cutting.

Technical meanings of the terms used in the above description will be explained below.

Machining Mode

Machining mode is among the tool movement conditions during machining, and is the necessary information to be input into the NC data generating means.

The NC data generating means computes a tool path when the tool is moved in accordance with the machining mode.

Typical machining mode includes a contour line machining mode, scanning line machining mode, along-surface machining mode, and the like. Some of these machining modes are specific to the NC data generating means.

Rule for Determining Machining Mode

A rule for determining machining mode is a rule for determining a machining mode for each process using, as identification data, the process determined in the process computing section, the tool configuration for each process and the machining mode stored in the NC data generating means that is separately registered.

Rule for Determining Cutting Conditions

A rule for determining cutting conditions is a rule for dividing the value of machining capabilities, in accordance with the tooling for each process determined in the process computing section, with respect to a depth of cut in the axial direction of the tool, a depth of cut in the radial direction of the tool, and a feed rate.

The value of machining capabilities is represented by the cutting volume per unit time in the process computing section for rough cutting, and by the cutting area per unit time in the process computing section for finish cutting.

Computed Data of Machining Capabilities

Computed data of machining capabilities is, for example, the tool coefficient determined from the material and profile of the tool and the like, and the work piece coefficient determined from the material of the work piece. A reference value of machining capabilities of a tool (a process) is computed by substituting the data in a predetermined computation equation. Further, a value of machining capabilities in consideration of tooling rigidity is computed by correcting the reference value of machining capabilities using a comparative value of the rigidity of a predetermined reference tooling and the rigidity of an actually used tooling. These processes are conducted in the process computing section.

In case that cutting conditions in accordance with the tool are registered in the machining information database, the reference machining capabilities is computed by multiplying the given depth of cutting in the axial direction and the feed rate without using the computed data of machining capabilities.

Next, requirement for the NC data generating module, which is a component of the present invention, will be described.

Generation of NC Data in Consideration of Interference in Tooling

Conventionally, the tool path has been computed based only on recognition of tool configuration without recognition of tool length or a holder. In the present invention, because the tool path is computed based on recognition of the tooling such as the tool length and the holder as well as the tool configuration, the NC data can be generated with respect to the area where a designated tooling advances to the utmost using the function to recognize the interference in tooling.

Generation of NC Data in Consideration of Uncut Portions

Conventionally-generated NC data was used for finish cutting the surface without recognizing portions remaining uncut in previous processes. The present invention, however, has a function to recognize the portions remaining uncut in previous processes. In case that many uncut portions exist, the present invention generates the NC data with which the uncut portions are removed before the surface is finished.

Generation of NC Data in Consideration of Overlap Between Machined Portions

In conventional machining, because it was impossible to recognize portions that have already machined, an operator had to designate the area for which the NC data would be generated to avoid overlap of NC data. The present invention, however, has a function to recognize the portions machined in previous processes, and the NC data with which the already-machine portions are not re-machined can be generated.

Next, requirement for the NC data verifying and editing module, which is a component of the present invention, will be described.

Correction of Feed Rate in Accordance with Cutting Load

Cutting load during cutting is predicted by simulation to correct the cutting feed rate command described in the NC data.

Deleting and Editing of Emptily Cutting Tool Path

Emptily cutting tool paths have conventionally been deleted and edited by an operator through screen operation. Otherwise, the NC data has been used for machining that includes empty tool operation. In the present invention, however, emptily cutting paths or emptily rapid transfer path in the NC data are detected and deleted. Then, to avoid interference or absurdity caused by uniform deletion, the paths around the deleted path are edited and rationalized.

Fifth Embodiment

Next, a fifth embodiment of the present invention will be described. In the fifth embodiment, a concrete method for determining the machining mode and the cutting conditions shown in FIGS. 3 through 6 will be described in detail.

Figure 8:
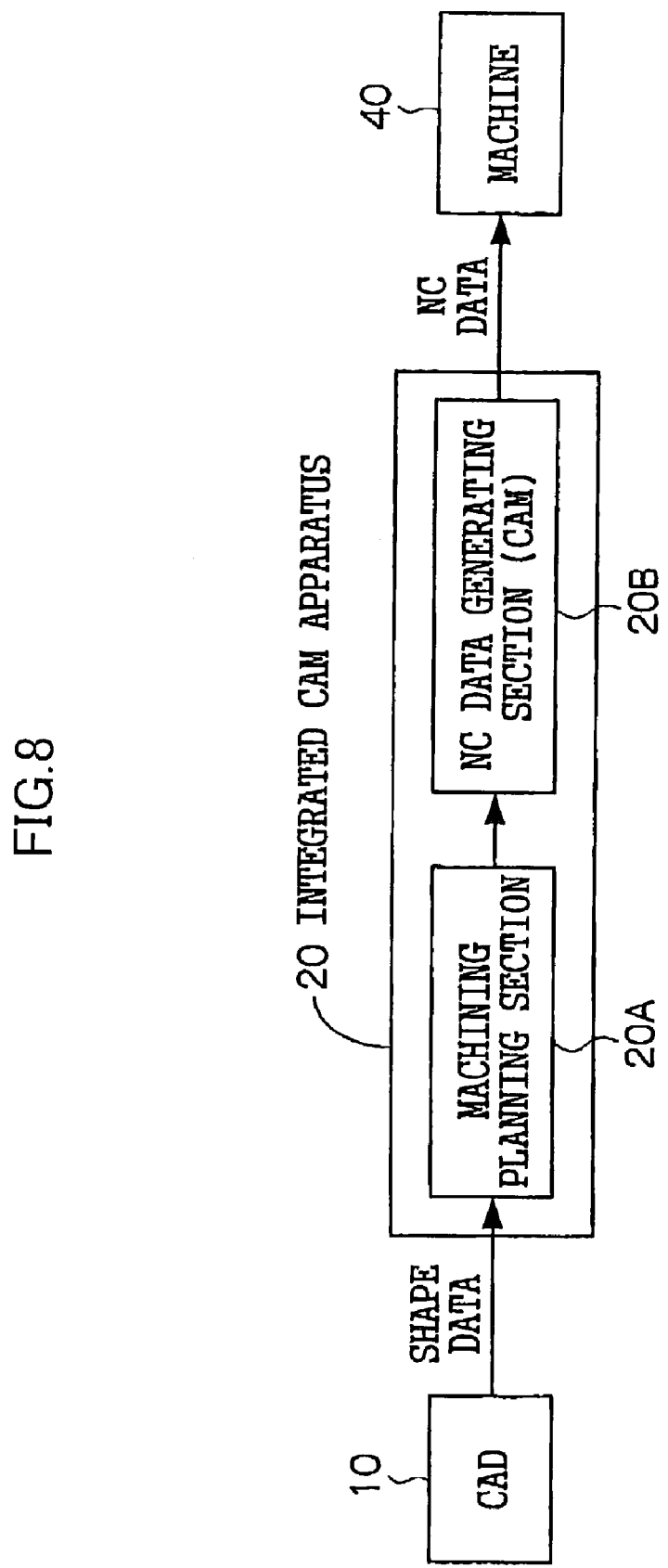
FIG. 8 is a block diagram which shows an overall structure of a machining system relating to a fifth embodiment of the present invention.

As shown in FIG. 8, a machining system relating to the present embodiment comprises CAD (Computer-Aided Design) 10 used for planning the shape of a mold such as a metal mold, an integrated CAM (Computer-Aided Manufacturing) apparatus 20 for converting the data of the mold shape designed by the CAD 10 into the data specific to a later-described machine 40 (hereinafter referred to as "NC data"), and a machine 40 for machining materials based on the NC data outputted from the integrated CAM apparatus 20.

Further, the integrated CAM apparatus 20 comprises a machining planning section 20A that plans concrete machining processes using the data of the mold shape designed by the CAD 10, and an NC data generating section 20B that generates the NC data based on the processes planned by the machining planning section 20A. The NC data generating section 20B has a function as a conventionally used CAM, or an apparatus for assisting the machine that generates the NC data in accordance with the type of the machine 40 using the data of the mold shape. Accordingly, a general purpose CAM may be provided instead of the NC data generating section 20B.

The machining planning section 20A outputs data regarding which tool to be used, which procedure to be employed, and which operation to be conducted with respect to the mold shape designed by the CAD 10. Specifically, the machining planning section 20A seeks the following: "process" indicating the process of the material through the last machining; "tool configuration" indicating the shape of a tool used in each process; "tooling" indicating combinations of tools used in each process and holders holding the tools; "machining capabilities" indicating the cutting volume or cutting area per unit time in each process; "CAM machining mode" indicating a machining mode (tool movement mode) in accordance with the NC data generating section 20B; and "cutting conditions" indicating the values of the machining capabilities divided in three dimensional directions in accordance with the conditions during cutting. The term "tooling" means the combinations of the tool attached to the holder protruding from the holder at a predetermined protruding amount. Different tooling provides different machining capabilities.

Figure 9:
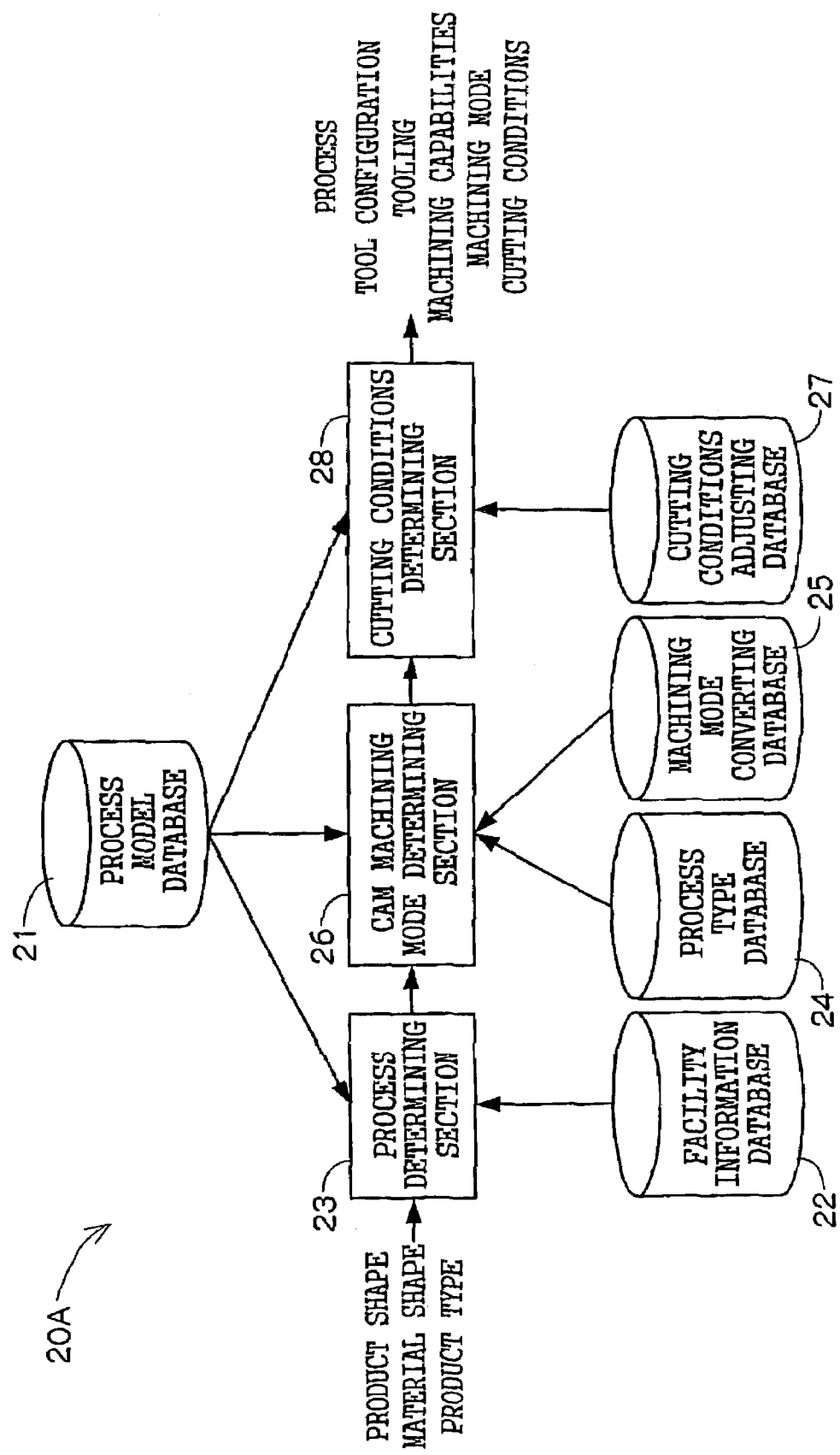
FIG. 9 is a block diagram which shows a functional structure of the CAM.

As shown in FIG. 9, the machining planning section 20A comprises a process model database 21 that stores process models; a facility information database 22 that stores tool configuration and holder information; a process determining section 23 that determines, through simulation, "process", "tool configuration", "tooling" and "machining capabilities"; a machining type database 24 that stores process types; a machining mode converting database 25 that stores machining mode converting data; a CAM machining mode determining section 26 that determines the CAM machining mode in accordance with the NC data generating section 20B; a cutting conditions adjusting database 27 that stores a plurality of cutting conditions adjusting data; and a cutting conditions determining section 28 that determines "cutting conditions" based on the cutting conditions adjusting data.

The process model database 21 stores a plurality of process models. The process model, provided for each type of product (mold), describes material of a metal mold, method of machining, adjustment during cutting, and the like. The product type includes, for example as shown in FIG. 10, cast, die-cast, forged, resin, and pressed. A product type code is provided to each of the product types.

The process model includes one or more sets of process modes or process mode types. For example, the process model shown in FIG. 11 includes a set of a process mode [R] indicating rough cutting and a process type [21] and a set of a process mode [F] indicating finish cutting and a process type [41]. Taking the process modes shown in FIG. 11 as examples, process models will be described in detail below.

The process model includes "process mode", "process type code", "maximum and minimum diameter of used tools", "material code", "cutting conditions adjusting code", "machining mode converting code", "tool replacement load coefficient" and "stage replacement load coefficient".

The "process mode" represents summary of machining content of the process model of interest. For example, the process mode [R] represents rough cutting and the process model [F] represents finish cutting.

The "process type code" represents concrete machining content. For example, as shown in FIG. 12, the code [11] represents "integrated rough cutting and finish cutting", the code [12] represents "uniformly leaving rough cutting" for "block material rough cutting", and the code [32] represents "normal rough cutting" for "casting material rough cutting". The "process type code" is used when a predetermined process type data is selected and read out from the process type database 24.

The "maximum [A] and minimum [B] diameter of used tools" indicates that the maximum diameter of the used tool is A[mm], and the minimum diameter of the used tool is B[mm].

The "material code" represents the material of the metal mold to be machined. The "material code" is roughly classified into ferric metal and non-ferric metal as shown in FIG. 13. The "material code" is assigned to each of ferric metals, such as rolled steel, carbon steel, alloy steel, tool steel, and the like. The "material code" is also assigned to non-ferric aluminum alloy, aluminum die-cast alloy, copper, and brass.

The "machining mode converting code" is used for selecting a predetermined machining mode converting data from the machining mode converting database 25. The machining mode converting data is represented by a table used for converting the machining mode of the machining planning section 20A into a CAM machining mode in accordance with the model (type) of the NC data generating section 20B. The "machining mode converting code" is assigned in accordance with the model and machining content of the NC data generating section 20B. For example, as shown in FIG. 14, when the mode of the NC data generating section 20B is "aaaa" and a "contour line machining" will be conducted, the "machining mode converting code" is [11], and when the same model of the NC data generating section 20B is used for "scanning line machining", the "machining mode converting code" is [12]. Further, when the mode of the NC data generating section 20B is "bbbb" and a "contour line machining" will be conducted, the "machining mode converting code" is [21], and when the same model of the NC data generating section 20B is used for "scanning line machining", the "machining mode converting code" is [22].

The "cutting conditions adjusting code" is used for selecting a predetermined cutting conditions adjusting data from the cutting conditions adjusting database 27. The cutting conditions adjusting data is represented by a table indicating how the machining capabilities of the tooling is divided in a predetermined direction (depth of cut in axial direction, depth of cut in radial direction, or feed rate).

As shown in FIG. 15, the "cutting conditions adjusting code" is roughly classified into two cases: a case where the depth of cut is prioritized; and a case where the feed rate is prioritized. For example, when the "depth of cut is prioritized" and the "axial direction" is prioritized, the "cutting conditions adjusting code" is [11], when the "depth of cut is prioritized" and the "uniform division" is selected, the "cutting conditions adjusting code" is [15], when the "feed rate is prioritized" and the "radial direction" is prioritized with respect to the cut, the "cutting conditions adjusting code" is [22], and when the "feed rate is prioritized" and the "specified division/in the axial direction" with respect to the cut is selected, the "cutting conditions adjusting code" is [23].

Figure 16:
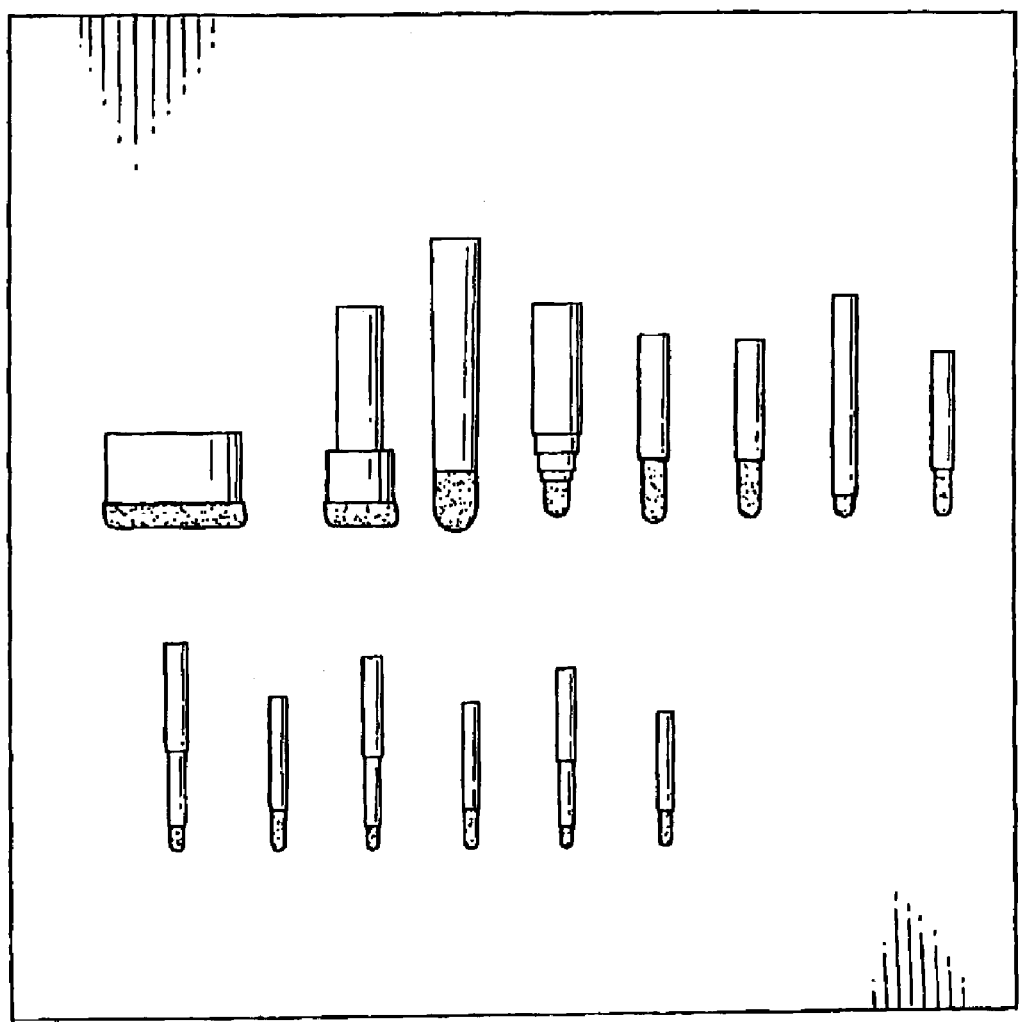
FIG. 16 is a drawing which illustrates models of tool information.
Figure 17:
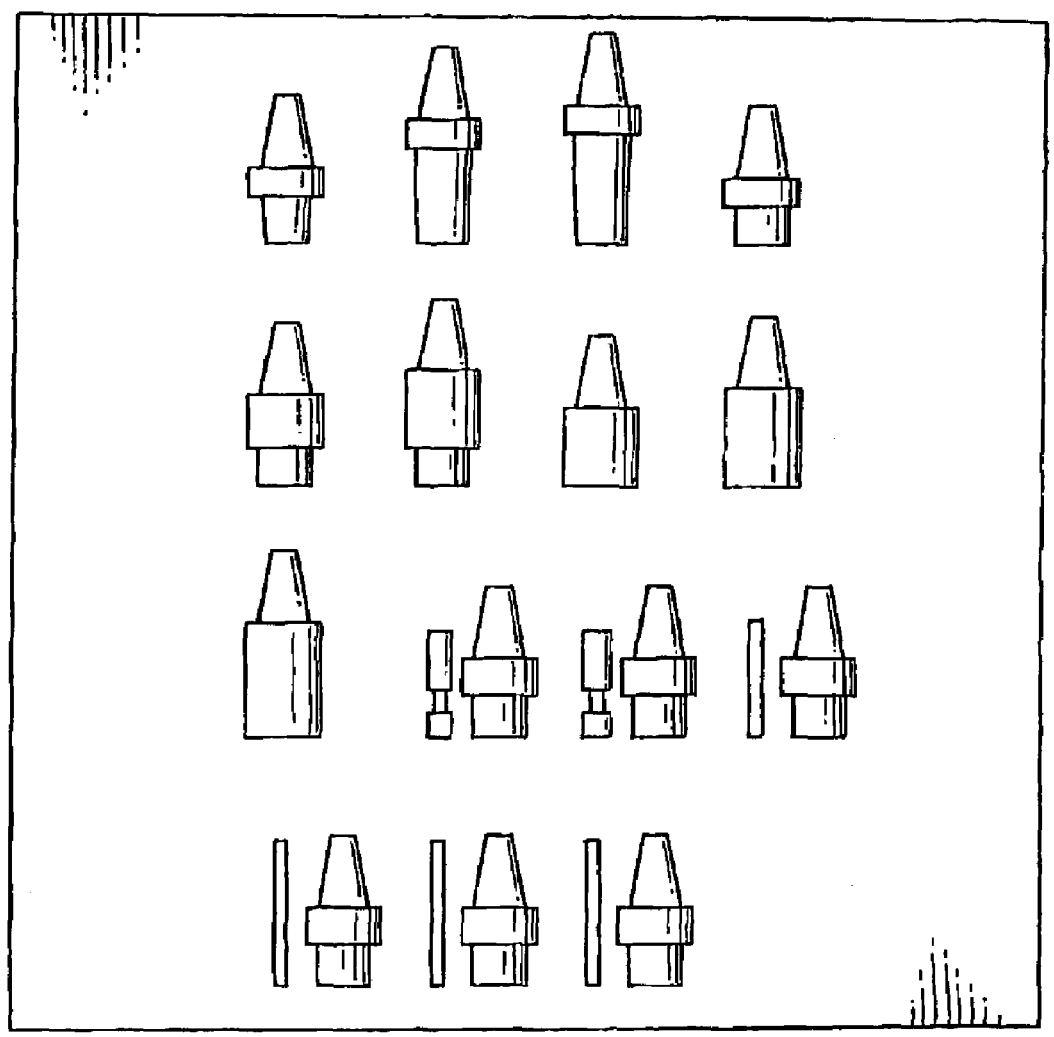
FIG. 17 is a drawing which illustrates models of holder information.

The facility information database 22 stores a plurality of tool information as the information regarding tools shown in FIG. 16 for example, and a plurality of holder information as the information regarding holders holding tools shown in FIG. 17 for example.

The process determining section 23 determines "process (e.g., process number)", "tool configuration for each process (e.g., tool tip configuration and tool diameter)", "tooling" and "machining capabilities" through simulation using information such as "product shape (mold shape)", "material shape", "product type", tool information and holder information stored in the facility information database 22.

The process type database 24 stores a plurality of process types. The process type represents rules for determining the machining mode such as "rough cutting" or "middle-finish cutting" for each process determined by the process determining section 23.

The "process type" is formed as shown in FIG. 18. In FIG. 18, the process type code is [11], which represents "integrated rough cutting and finish cutting". Other process type codes have structures similar to the structure shown in FIG. 12.

Further, the "process type" includes the number of conditions representing the number of conditions for determining the machining mode and the content of conditions representing the content of conditions for determining the machining mode. The machining mode shown in FIG. 18 has thirteen conditions and has the content of the conditions from 1 to 13.

Each content of the conditions indicates that when the "process number", "ball process order", "tool tip profile", "previous machining mode" and "tool diameter" are input, then "process division number", "machining mode" and "remained width coefficient" are outputted.

The "process number" represents the order of the process of interest. For example, "[=][1]" represents the process number 1, and "[>][1]" represents the process number greater than 1, i.e., the process number 2 or greater.

The "ball process order" represents the order of process only regarding the tools having ball-shaped tip profile (ball tools) in the process of interest. That is, the "ball process order" represents the order of the tools having ball-shaped tip profile extracted from the process with the process numbers from 1 assigned thereto. For example, "[=][1]" represents the process number 1 only regarding the ball tools, and "[>][1]" represents the process number greater than 1, i.e., the process number 2 or greater only regarding the ball tools.

The "tool tip profile" represents the tip profile of the tool. For example, [FLAT] represents flat tools, [RADIUS] represents radius tools, and [BALL] represents ball tools.

The "previous machining mode" represents the machining mode determined for the machining mode directly before the process of interest. For the machining mode, for example, [RC] represents rough cutting mode, [MC] represents middle-finish cutting mode, [FC] represents finish cutting mode, and [LFC] represents local finish cutting mode. Other machining mode includes, as shown in FIG. 19 for example, [MC+] representing middle-finish cutting with smoothing mode, [FC+] representing finish cutting with smoothing mode, and [LMC] representing local middle-finish cutting mode. Here, [+] represents "with smoothing".

The "tool diameter" represents the diameter of tools. For example, [>20] represents the tool diameter greater than 20 mm, and [<20] represents the tool diameter equal to or smaller than 20 mm (including 20 mm).

The "process division number" represents how many numbers the process of interest is to be divided. For example, [1] represents that the process of interest is not divided, and [2] represents that the process of interest is to be divided into two.

The "machining mode" represents the machining mode of the process of interest and is represented by the codes shown in FIG. 19. That is, the "machining mode" and the "previous machining mode" are represented by similar codes.

When the "process division number" is [2], the "machining mode" is provided for each of the processes serially divided into two. For example, the "machining mode" in the condition 7 indicates that the initial mode is the middle-finish cutting with smoothing mode [MC+] and then switches to the finish cutting with smoothing mode [FC+]. The "machining mode" in the condition 12 indicates that the initial mode is the local middle-finish cutting mode [LMC] and then switches to the local finish cutting mode [LFC].

Therefore, in the "integrated rough cutting and finish cutting" of the process type code [11], the process type data shown in FIG. 18 has the meaning shown in FIG. 20, with respect to the conditions 1 through 13.

The machining mode converting database 25 stores the machining mode converting data used for converting the machining mode into the CAM machining mode for each mode of the NC data generating section 20B [CAM]. The machining mode converting data includes machining mode converting codes shown in FIG. 21 for example. The machining mode converting codes specify the mode of the CAM and the machining content of the machine 40 by the CAM of interest.

For example, the "machining mode converting code" [11] represents that the CAM mode is "aaaa" and a "contour line machining" will be conducted. Further, the machining mode converting code are provided for each CAM mode and machining content, as shown in FIG. 14. That is, the "machining mode converting code" in the process model shown in FIG. 11 corresponds to the "machining mode converting code" shown in FIG. 21.

The machining mode converting data represents the "process division number" and the "CAM machining mode" to be outputted when the machining mode code is input. For example, when the machining mode code [RC] representing rough cutting is input in the example shown in FIG. 21, [1] is outputted as the "process division number" and [contour line rough machining] is outputted as the "CAM machining mode". Further, when the machining mode code [MC+] representing middle-finish cutting with smoothing is input, [2] is outputted as the "process division number" and [contour line staged middle-finish cutting] and [contour line optimization] are outputted as the "CAM machining mode". In the machining mode converting data shown in FIG. 21, correspondence between the input machining mode and outputted CAM machining mode is shown in FIG. 22. The CAM machining mode codes are shown in FIG. 23.

The CAM machining mode determining section 26 specifies the process type data in the process type database 24 based on the process type code and the machining mode converting code described in the process model, and then specifies the machining mode converting data in the machining mode converting database 25. The CAM machining mode determining section 26 then determines the CAM machining mode using the specified data and based on the process number of each process, tool configuration, and the like.

The cutting conditions adjusting database 27 stores the cutting conditions adjusting data for each adjusting code. The cutting conditions adjusting data represents that the machining capabilities of the tool is divided in a predetermined ratio with respect to the depth of cut in axial direction, depth of cut in radial direction, and feed rate.

As shown in FIG. 24, the cutting conditions adjusting data includes the cutting conditions adjusting code and the number of adjusting stages indicating how many stages the machining capabilities is to be divided into for adjustment. The cutting conditions adjusting code is used for selecting a predetermined cutting conditions adjusting data from a plurality of cutting conditions adjusting data. The above-described cutting conditions adjusting code corresponds to the "cutting conditions adjusting code" described in the process modes shown in FIG. 11 and shown in FIG. 15. For example, the cutting conditions adjusting data shown in FIG. 24 represents "specified division/the axial direction being prioritized" in accordance with the cutting conditions adjusting code [13] described in the data of interest and with FIG. 15.

The cutting conditions adjusting data specifies "adjusting ratio" and "lower limit value" for each direction of the depth of cut in axial direction, depth of cut in radial direction, and feed rate for each adjusting stage. The "adjusting ratio" is the value represented by percentage indicating the ratio at which the machining capabilities of the tooling is divided. The "adjusting ratio" of "0"% means that the machining capabilities of the direction of interest is set to be a predetermined reference value or the lower limit value. The "lower limit value" is the lower limit value of the division value (cutting conditions) when the machining capabilities is divided in accordance with the "adjusting ratio". Accordingly, even when the machining capabilities of the tooling is divided in accordance with the "adjusting ratio", each divided cutting condition does not fall under the "lower limit value".

The cutting conditions determining section 28 divides the machining capabilities in each process into the depth of cut in axial direction, depth of cut in radial direction, and feed rate using the cutting conditions adjusting data stored in the cutting conditions adjusting database 27 to determine the cutting conditions.

The machining planning section 20A structured as above plans a concrete procedure (e.g., process, tool configuration, tooling, machining capabilities, machining mode and cutting conditions) for machining with the product of interest based on the product shape, material shape and product type.

The process determining section 23 determines a machining procedure, tool configuration, tooling and machining capabilities as an optimum combination that enables the shortest machining time, using information such as product shape, material shape, product type, process model stored in the process model database 21, and facility information (tool information and holder information) stored in the facility information database 22.

Figure 25:
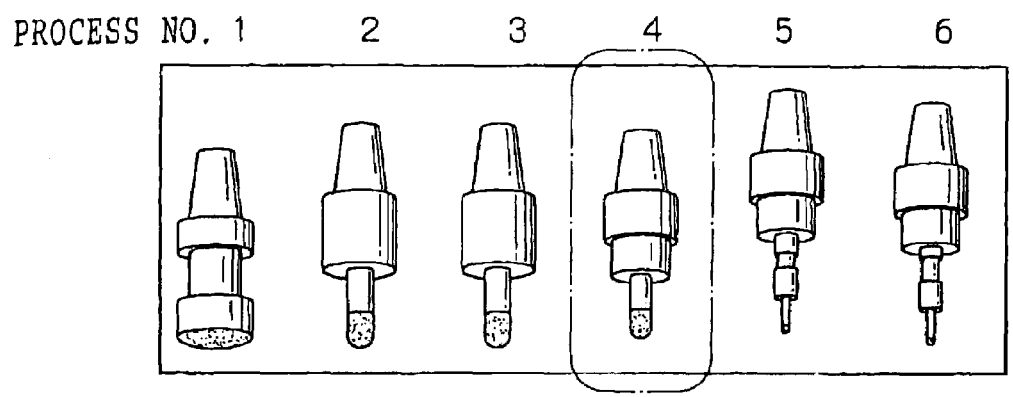
FIG. 25 is a drawing which illustrates a process determined at a process determining section and tooling for each process.

In the present embodiment, the process determining section 23 determines the "process" including processes 1 through 6, "tool configuration" in each process, "tooling" and "machining capabilities" thereof, as shown in FIG. 25.

Figure 26:
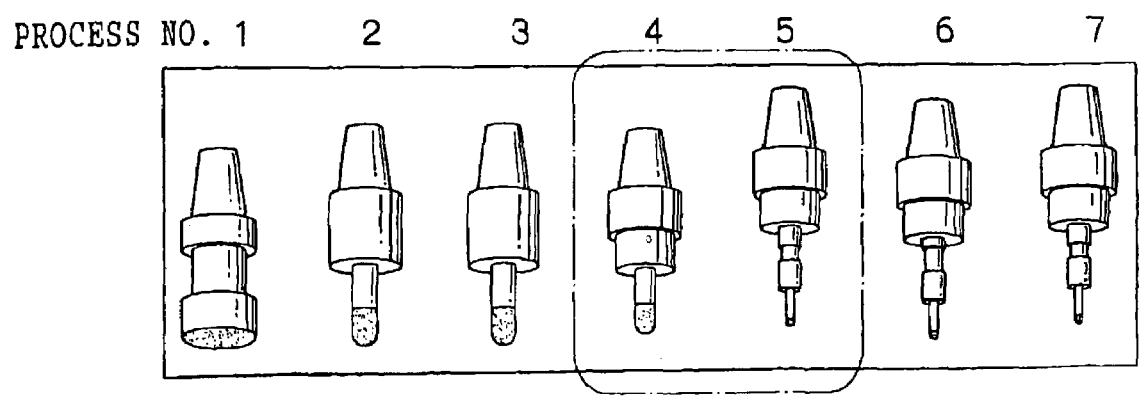
FIG. 26 is a drawing which illustrates tooling for each process in a case where a typical operator has determined a process.

FIG. 26 illustrates tooling for each process when a typical operator determines process. The process of the process number 4 shown in FIG. 25 is a process where the process numbers 5 and 6 in FIG. 26 are combined. The overall process of FIG. 25 has fewer numbers of processes and thus has shorter machining time than the overall process of FIG. 26.

Figure 27:
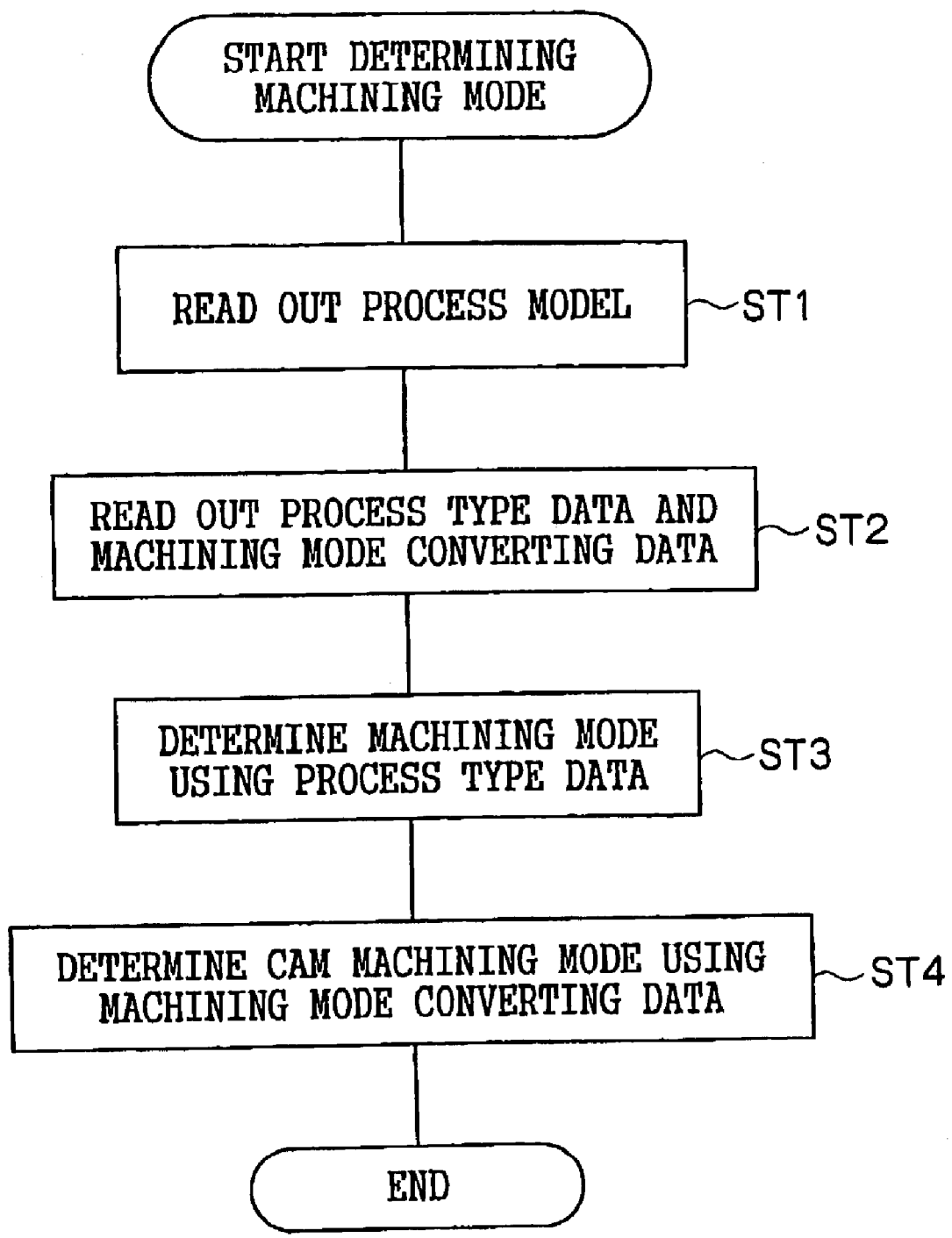
FIG. 27 is a flow chart which describes an operation procedure in a CAM machining mode determining section.

Next, the CAM machining mode determining section 26 performs the processes of step ST1 through step ST4 in FIG. 27.

In step ST1, the CAM machining mode determining section 26 reads out a process model in accordance with the product type from the process model database 21 and the process proceeds to step ST2. The CAM machining mode determining section 26 may use the process model used in the process determining section 23.

In step ST2, the CAM machining mode determining section 26 extracts a process type code ([11] for example) and a machining mode converting code ([11] for example) described in the process model. Then, the CAM machining mode determining section 26 reads out a process type data having the extracted process type code from the process type database 24 and reads out a machining mode converting data having the extracted machining mode converting code from the machining mode converting database 25, and the process proceeds to step ST3.

Here, we assume that the process type data shown in FIG. 18 and the machining mode converting data shown in FIG. 21 are extracted.

In step ST3, the CAM machining mode determining section 26 determines a machining mode using the process type data. Specifically, the CAM machining mode determining section 26 determines whether the "process" determined by the process determining section 23 and the "tool configuration" of the tool used in the process of interest (in case of the process number greater than 2, the "previous machining mode" is included) correspond to which input condition among the thirteen input conditions shown in FIG. 20. Then, the CAM machining mode determining section 26 outputs the machining mode in accordance with the input condition of interest. After the CAM machining mode determining section 26 outputs the machining mode for each of all the processes, the process proceeds to step ST4.

In step ST4, the CAM machining mode determining section 26 converts the machining mode for each machining mode into the CAM machining mode based on the correspondence between the input machining mode and the outputted CAM machining mode shown in FIG. 22 and then output the converted CAM machining mode.

As described above, the CAM machining mode determining section 26 selects a process type data and a machining mode converting data based on the process model in accordance with the product type. Then, using the selected data, the CAM machining mode determining section 26 can automatically determine the CAM machining mode in accordance with the NC data generating section 20B by determining a CAM machining mode for each process at the time of machining the product.

The CAM machining mode determining section 26 can determine an accurate machining mode with simple condition content by particularly using the process type data that is used for outputting a machining mode based on a combination of the process number, previous machining mode, tool tip profile, and tool diameter.

Further, the CAM machining mode determining section 26 can determine a preferable and practical machining mode for machining three-dimensional curved surface by using the process type data that requires a process number of a tool having a ball-shaped tip profile to be input.

Moreover, the CAM machining mode determining section 26 can automatically seek a CAM machining mode in accordance with the multi-purpose NC data generating section 20B [CAM] by using a machining mode converting data representing the correspondence between the machining mode and the CAM machining mode.

Figure 28:
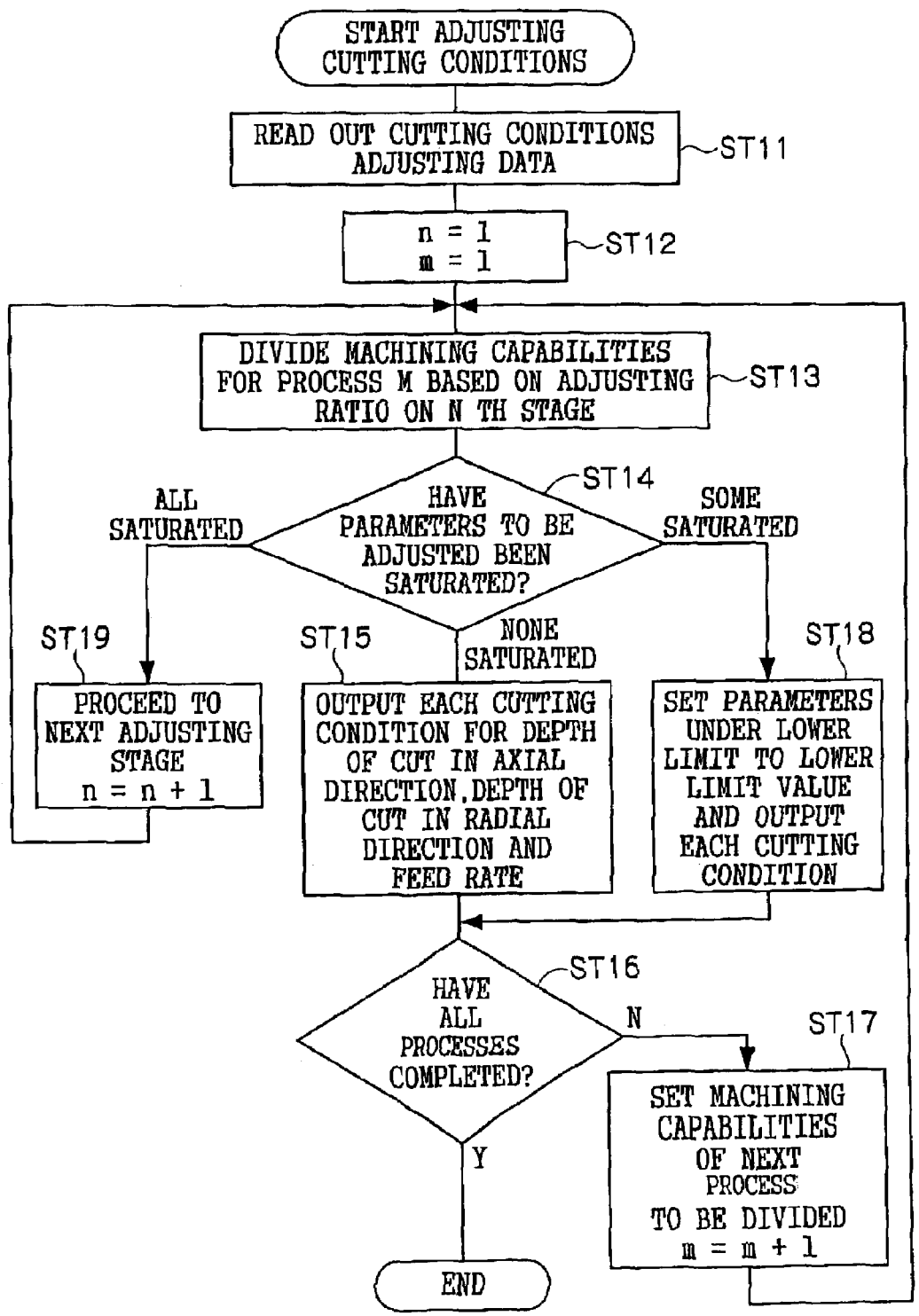
FIG. 28 is a flow chart which describes an operation procedure in a cutting conditions determining section.

The cutting conditions determining section 28 performs the processes of step ST11 through step ST18 shown in FIG. 28 to divide the machining capabilities in each process.

In step ST11, the cutting conditions determining section 28 extracts a cutting conditions adjusting code ([13] for example) described in the process model. Then, the cutting conditions determining section 28 reads out a cutting conditions adjusting data having the extracted cutting conditions adjusting code from the cutting conditions adjusting database 27 and the step proceeds to step ST12. As a result, the cutting conditions determining section 28 reads out the cutting conditions adjusting data shown in FIG. 24.

In step ST12, the cutting conditions determining section 28 sets the initial value of the n th stage specifying the stage to be adjusted to 1, and sets the initial value of the process m specifying the process to 1, and the process proceeds to step ST13.

In step ST13, the cutting conditions determining section 28 divides the machining capabilities for the process of the process number m based on the adjusting ratio on the n the stage. Hereinafter, we assume that the machining capabilities in each process of process number 1 or later is as follows and the machining capabilities will be described referring to FIG. 24.

machining capabilities of tooling in the process number 1 of process: 2500 [mm$^3$/min]

machining capabilities of tooling in the process number 2 of process: 20 [mm$^3$/min]

machining capabilities of tooling in the process number 3 of process: 8 [mm$^3$/min]

(process number 4 or later will be omitted)

The cutting conditions determining section 28 sets the feed rate of the first stage to a predetermined reference value (100 for example) of the tooling of interest and divides 50% of the balance machining capabilities of the tooling to the depth of cut in the axial direction and 50% to the depth of cut in the radial direction. Namely, the cutting conditions of the depth of cut in the axial and radial directions is denoted by:

$$\sqrt{\frac{2500[\text{mm}^3/\text{min}]\left(\begin{array}{c}\text{MACHINING CAPABILITIES}\\\text{OF PROCESS NUMBER 1}\end{array}\right)}{100[\text{mm/min}](\text{REFERENCE VALUE OF FEED RATE})}} = 5[\text{mm}]$$

In this manner, the cutting conditions determining section 28 divides the machining capabilities 2500 of the process number 1 based on the cutting conditions adjusting data, and seeks the cutting conditions [5] for the depth of cut in the axial and radial directions and the cutting conditions [100] for the feed rate. Then, the process proceeds to step ST14. The machining capabilities of the process of interest can be obtained by multiplying the depth of cut in the axial/radial directions and the feed rate.

In step ST14, the cutting conditions determining section 28 determines whether the parameters to be adjusted have been saturated, that is, whether each cutting condition with respect to the depth of cut in the axial/radial directions and the feed rate has been saturated. When neither of the cutting conditions has been saturated, the process proceeds to step ST15. When some of the cutting conditions (except the adjusting ratio of 0) have been saturated, the process proceeds to step ST18. When all the cutting conditions (except the adjusting ratio of 0) have been saturated, the process proceeds to step ST19.

In step ST15, the cutting conditions determining section 28 determines each cutting condition sought in step ST13 (in the above-described example, the cutting conditions [5] for the depth of cut in the axial and radial directions and the cutting conditions [100] for the feed rate) and proceeds to step ST16.

In step ST16, the cutting conditions determining section 28 determines whether division of the machining capabilities of all the processes has completed. When the division has completed, a series of processes terminates and when the division has not completed, the process proceeds to step ST17.

In step ST17, the cutting conditions determining section 28 increments the process number m (m=m+1) so that the machining capabilities of the next process is to be divided. Then, the process returns to step ST13. Then, the cutting conditions determining section 28 repeats the processes of step ST13 and steps thereafter.

The cutting conditions determining section 28 divides the machining capabilities for the processes of process number 2 and greater in the following manner. In step ST13, when the machining capabilities of the process of process number 2 is 20, the cutting conditions determining section 28 sets the feed rate in the first stage to the reference value of 100 used in step ST13 and divides 50% of the balance machining capabilities of the tooling to the depth of cut in the axial direction and 50% to the depth of cut in the radial direction. Namely, the cutting conditions of the depth of cut in the axial and radial directions is denoted by:

$$\sqrt{\frac{20[\text{mm}^3/\text{min}]\left(\begin{array}{c}\text{MACHINING CAPABILITIES}\\\text{OF PROCESS NUMBER 2}\end{array}\right)}{100[\text{mm/min}](\text{REFERENCE VALUE OF FEED RATE})}} = 0.447[\text{mm}]$$

Here, the cutting condition [0.447] for the depth of cut in the axial direction is greater than the lower limit value of 0.1. However, the cutting condition [0.447] for the depth of cut in the radial direction is smaller than the lower limit value of 0.5, and is in a saturated state. Thus, in step ST14, the cutting conditions determining section 28 determines that only the depth of cut in the radial direction is saturated and the process proceeds to step ST18.

In step ST18, the cutting conditions determining section 28 sets the cutting conditions of the depth of cut in the radial direction that fell under the lower limit value to the lower limit value of 0.5. The cutting conditions determining section 28 re-sets the feed rate at the first stage to the reference value of 100 that was used in step ST13, re-sets the cutting conditions of the depth of cut in the radial direction to the lower limit value of 0.5, and divides the balance machining capabilities to the depth of cut in the axial direction. As a result, the cutting conditions of the depth of cut in the axial direction can be denoted by:

$$\frac{20[\text{mm}^3/\text{min}]\binom{\text{MACHINING CAPABILITIES OF}}{\text{PROCESS NUMBER 2}}}{100[\text{mm/min}]\binom{\text{REFERENCE VALUE}}{\text{OF FEED RATE}}} = 0.4[\text{mm}]$$

$$0.5[\text{mm}]\binom{\text{LOWER LIMIT VALUE FOR DEPTH}}{\text{OF CUT IN RADIAL DIRECTION}}$$

The cutting conditions of the depth of cut in the axial direction is 0.4, which is greater than the lower limit value of 0.1 and thus is not saturated. Therefore, the cutting conditions determining section 28 outputs the cutting conditions for the depth of cut in the axial/radial directions and the feed rate, and the process proceeds to step ST16. After steps ST16 and ST17, the cutting conditions determining section 28 returns to step ST13 for division of the machining capabilities of the next process of process number 3.

The cutting conditions determining section 28 divides the machining capabilities 4 of the next process of process number 3 in the following manner. Again in the first stage, the cutting conditions determining section 28 sets the feed rate for the first stage to the reference value of 100 that was used in step ST13, re-sets the cutting conditions of the depth of cut in the radial direction to the lower limit value of 0.5, and divides the balance machining capabilities to the depth of cut in the axial direction. As a result, the cutting conditions of the depth of cut in the axial direction can be denoted by:

$$\frac{4[\text{mm}^3/\text{min}]\binom{\text{MACHINING CAPABILITIES OF}}{\text{PROCESS NUMBER 3}}}{100[\text{mm/min}]\binom{\text{REFERENCE VALUE}}{\text{OF FEED RATE}}} = 0.08[\text{mm}]$$

$$0.1[\text{mm}]\binom{\text{LOWER LIMIT VALUE FOR DEPTH}}{\text{OF CUT IN RADIAL DIRECTION}}$$

Here, the cutting conditions of the depth of cut in the axial direction is smaller than the lower limit value of 0.1 and thus is saturated. Therefore, the cutting conditions determining section 28 determines that both of the depth of cut in the axial and radial directions are saturated, and the process proceeds from step ST14 to step ST19.

In step ST19, the cutting conditions determining section 28 increments the n (n=n+1) so that the process proceeds to the next adjusting stage of the cutting conditions adjusting data and the process returns to step ST13. That is, because the cutting conditions determining section 28 processed the first stage of the cutting conditions adjusting data in the above description, the cutting conditions determining section 28 proceeds to the process of the next second stage.

In the second stage of the cutting conditions adjusting data, the adjusting ratio of the depth of cut in the axial direction is 0%, the adjusting ratio of the depth of cut in the radial direction is 100%, and the adjusting ratio of the feed rate is 0%. This means that the cutting conditions determining section 28 sets the machining capabilities of the saturated state in the previous stage (lower limit value of 0.1) for the depth of cut in the axial direction, sets the machining capabilities of the machining capabilities that has been set for the previous stage (the reference value of 100) for the feed rate, and sets all of the balance machining capabilities to the depth of cut in the radial direction. As a result, the cutting conditions of the depth of cut in the axial direction can be denoted by:

$$\frac{4[\text{mm}^3/\text{min}]\binom{\text{MACHINING CAPABILITIES OF}}{\text{PROCESS NUMBER 3}}}{100[\text{mm/min}]\binom{\text{REFERENCE VALUE}}{\text{OF FEED RATE}}} = 0.4[\text{mm}]$$

$$0.1[\text{mm}]\binom{\text{LOWER LIMIT VALUE FOR DEPTH}}{\text{OF CUT IN AXIAL DIRECTION}}$$

The cutting conditions of the depth of cut in the axial direction is 0.4, which is greater than the lower limit value of 0.1 and thus is not saturated. Therefore, the cutting conditions determining section 28 determines and outputs the cutting condition [100] for the depth of cut in the axial direction, the cutting condition [0.1] for the depth of cut in the radial direction, and the cutting condition [0.4] for the feed rate for the second stage (step ST15).

Then, the cutting conditions determining section 28 determines each cutting condition by repeating the processes of step ST16 and the later steps to divide the machining capabilities of the tooling for each process to the depth of cut in the axial direction, the depth of cut in the radial direction, and the feed rate.

As described above, the cutting conditions determining section 28 can divide the machining capabilities to the depth of cut in the axial direction, the depth of cut in the radial direction, and the feed rate by considering the difference in machining capabilities between processes. Therefore, the cutting conditions determining section 28 can generate the machining data that can be used for machining products under optimum cutting conditions in every process.

Regarding the cutting conditions, when the same cutting load is applied, the tool feed rate may decrease by increasing the depth of cut, or the feed rate may increase by decreasing the depth of cut. That is, the cutting conditions have various alternatives which can be determined by considering the characteristics of the machines or tools, based on the expertise in the machining field.

The cutting conditions determining section 28 can appropriately divide the machining capabilities so as not to come to saturation based on the expertise in the machining field by using the cutting conditions adjusting data including the above-described expertise. Accordingly, the cutting conditions determining section 28 can automatically determine the cutting conditions in accordance with actuality in the machining field.

Note that the present invention is not limited to the above-described embodiments and many modifications in design can be made within the scope of the present invention set forth in claims. For example, the process model, process type data, machining mode converting data and cutting conditions adjusting data are used for exemplifying the embodiments of the present invention. Therefore, these data may also describe codes and the like different from those described above.

Sixth Embodiment

Figure 29:
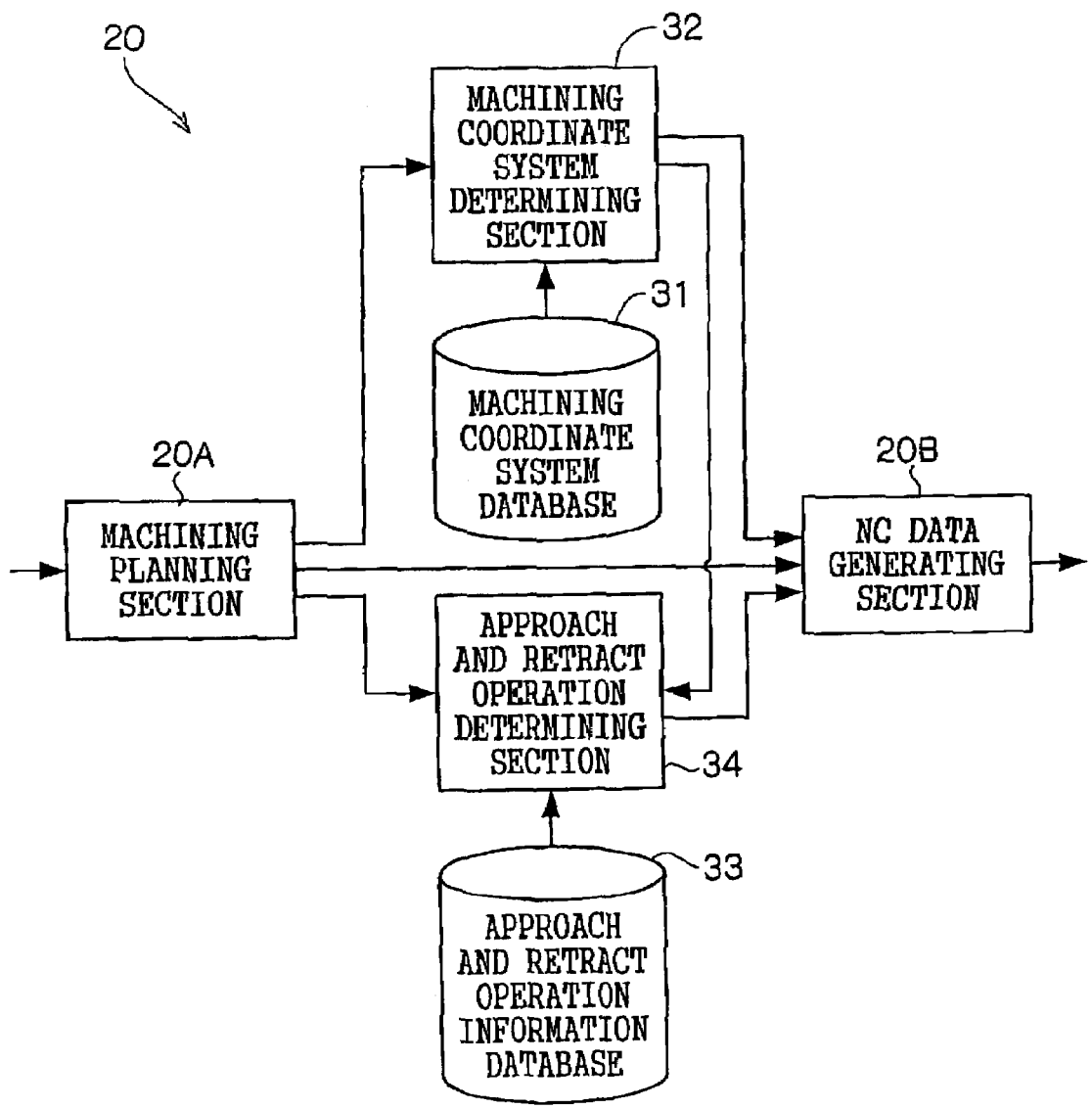
FIG. 29 is a block diagram which shows a structure of an integrated CAM apparatus of the fifth embodiment of the present invention.

Next, a sixth embodiment of the present invention will be described. Components similar to those in the fifth embodiment are denoted by the similar reference numerals and description thereof will be omitted. In the sixth embodiment, the integrated CAM apparatus 20 is structured as shown in FIG. 29. The CAM and the machine are similar to those shown in FIG. 8 and illustration thereof will be omitted.

As shown in FIG. 29, the integrated CAM apparatus 20 comprises a machining planning section 20A that automatically plans a concrete process using the data of the mold shape designed by the CAD; a machining coordinate system database 31 that stores machining coordinate system data; a machining coordinate system determining section 32 that determines an original position of machining and a tool movement start position; an approach and retract operation information database 33 that stores tool operation information; an approach and retract operation determining section 34 that determines tool operation; and an NC data generating section 20B that generates NC data based on the data from the machining planning section 20A, the machining coordinate system determining section 32 and the approach and retract operation determining database 34.

The machining coordinate system database 31 stores the machining coordinate system data for each "product type code". Namely, the machining coordinate system data comprises "original position of machining", "tool movement start position", "rapid movement Z plane", and "approaching and retracting code", as shown in FIG. 30.

The "product type code" is used for specifying the mold shape and is similar to that shown in FIG. 10. The "original position of machining" is the original position of machining on the product reference surface. The original positions of [XL], [YL] and [ZL] represent that the original position of machining is set to be the minimum value of each X-coordinate, Y-coordinate and Z-coordinate on the product reference surface. [XU], [YU] and [ZU] represent that the original position of machining is set to be the maximum value of each X-coordinate, Y-coordinate and Z-coordinate on the product reference surface.

The "tool movement start position" represents the X-coordinate, Y-coordinate and Z-coordinate of the tool movement start position. Note that X-coordinate, Y-coordinate and Z-coordinate is indicated from the left in the bracket. The "rapid movement Z plane" represents that the tools can be rapidly moved freely on the area above the plane Z of interest. The value within the bracket is the Z-coordinate that represents the plane Z. The "approaching and retracting code" specifies the tool operation information stored in the approach and retract operation information database 33.

The approach and retract operation information database 33 stores tool operation information for each approach and retract operation code. The tool operation information comprises "method of approaching", "rapid movement approach limit", "approach operation start position", and "rapid movement retract start position" for each CAM machining mode, as shown in FIG. 31. The CAM machining mode is similar to that shown in FIG. 23.

The "method of approaching" represents that the tool is moved (moved close) to an initial cutting command position by specifying operations such as a spiral path, circular path, and vertical down. [ZSPI] denotes a spiral motion, [ZCIR] denotes a circular motion, and [ZDOW] denotes a vertical down motion approaching from Z direction. The "rapid movement approach limit" refers to a value representing the distance (in mm) that the tool is rapidly moved upwards from the initial command position.

The "approach operation start position" refers to a value representing the distance (in mm) above the initial cutting command position at which the approach operation begins. The "rapid movement retract start position" refers to a value representing the distance (in mm) above the last cutting command position at which the rapid movement operation begins.

In the thus structured integrated CAM apparatus 20, the machining coordinate system determining section 32 operates as follows.

First, the machining coordinate system determining section 32 reads out machining coordinate system data from the machining coordinate system database 31 based on the product type code provided by the machining planning section 20A. Then, the machining coordinate system determining section 32 extracts the "original position of machining", "tool movement start position", "rapid movement Z plane", and "approaching and retracting code" that are described in the machining coordinate system data of interest. Then, the machining coordinate system determining section 32 provides the "original position of machining", "tool movement start position", "rapid movement Z plane" to the NC data generating section 20B and provides the "approaching and retracting code" to the operation determining section 34.

When the product type code is [101] for example, the machining coordinate system determining section 32 extracts [XL], [YL] and [ZL] as the "original position of machining", [0.0], [0.0] and [200.0] as the "tool movement start position", and [150.0] as the "rapid movement Z plane" and provides them to the NC data generating section 20B. The machining coordinate system determining section 32 also provides [11] as the "approaching and retracting code" to the approach and retract operation determining section 34.

The approach and retract operation determining section 34 extracts "method of approaching", "rapid movement approach limit", "approach operation start position", and "rapid movement retract start position" among the tool operation information based on the "approaching and retracting code" provided from the machining coordinate system determining section 32 and the CAM machining mode provided from the machining planning section 20A and provides them to the NC data generating section 20B.

As a result, the NC data generating section 20B can generate NC data using the data such as the "original position of machining" provided from the machining coordinate system determining section 32 and the "method of approaching" provided from the approach and retract operation determining section 34.

The tool path at the time of approaching and retracting is an important factor upon which whether the tool breaks or not depends, and was conventionally determined by an operator.

However, the integrated CAM apparatus relating to the embodiment of the present invention can determine a safe and appropriate tool path based on the expertise of skilled operators in accordance with product types, by using the machine coordination system data describing data regarding tool path at the time of approaching and retracting and the tool operation information. Therefore, because the integrated CAM apparatus 20 can generate NC data that includes the data regarding tool path at the time of approaching and retracting, the problems such as breakage of tools in the machine during machining can be avoided.

Note that the machining coordinate system database 31, the machining coordinate system determining section 32, the approach and retract operation information database 33 and the approach and retract operation determining database 34 can be provided on a dedicated interface that is provided between the machining planning section 20A and the NC data generating section 20B. With this structure, by merely interposing the dedicated interface between the machining planning section 20A and the NC data generating section 20B, various machining planning section 20A and NC data generating section 20B can be integrated, whereby flexibility and extendibility of the overall system are improved remarkably.

Note that the present invention is not limited to the above-described embodiments and many modifications in design can be made within the scope of the present invention set forth in claims. For example, the machining coordinate system data and the tool operation information are used for exemplifying the embodiments of the present invention. Therefore, these data may also describe codes and the like different from those described above.

INDUSTRIAL APPLICABILITY

As described above, the integrated CAM system, the method of integrally generating NC data, the machining planning system, the machining data generating apparatus and the program therefor are used for implementing mechanical or electrical machining using the NC data.

What is claimed is:

1. A computer storing a program, which when executed by the computer, causes the computer to perform a method of integrally generating NC data, the method comprising the steps of:

inputting a shape of a work piece;

planning a method of machining the work piece;

generating NC data used for machining the work piece;

verifying and editing the NC data, wherein said verifying and editing step comprises verifying insignificant emptily cutting portions and deleting NC data corresponding to the emptily cutting portions, and editing the NC data around the emptily cutting portions in consideration of the effects on machining; and outputting the verified and edited NC data, wherein the NC data is integrally generated based on the shape data of the work piece as the work piece successively passes through these steps, and wherein the step of planning the method of machining comprises a step of determining processes in consideration of minimum machining cost, a step of determining, for each determined process, tooling conditions represented by a combination of a tool and a holder, tool movement conditions suitable for each determined process, and cutting conditions of machining capabilities adjusted for the determined tooling conditions, and accessing a machining information database that contains a rule for determining a machining mode, a rule for determining cutting conditions and data for computing machining capabilities, wherein the rule for determining cutting conditions is a rule for dividing the value of machining capabilities in accordance with the tooling for each process with respect to a depth of cut in the axial direction of the tool, a depth of cut in the radial direction of the tool, and a feed rate 2. The computer of claim 1, wherein the generating step further comprises:

computing a tool path which considers tooling interference, uncut areas in a previous process, and overlap with a tool path of the previous process, or considers uncut areas in the previous process and overlap with the tool path of the previous process.

3. The computer of claim 1, wherein the verifying and editing step further comprises:

verifying a cutting load and correcting a feed rate in accordance with the verified cutting load.

4. The computer of claim 1, wherein any one of the generating step, the verifying and editing step and the outputting step, further comprises:

converting NC data of a format particular to the generated NC data into NC data of a predetermined format with which an NC machine can operate.

5. A computer storing a program, which when executed by the computer, causes the computer to perform a method of integrally generating NC data, the method comprising the steps of:

inputting a shape of work piece;

planning a method of machining the work piece;

generating NC data used for machining the work piece;

verifying and editing the NC data, wherein said verifying and editing step comprises verifying insignificant empty cutting portions and deleting NC data corresponding to the empty cutting portions, and editing the NC data around the emptily cutting portions in consideration of the effects on machining; and outputting the verified and edited NC data, wherein the NC data is integrally generated based on the shape data of the work piece as the work piece successively passes through these steps, and wherein the step of planning the method of machining comprises a step of determining processes in consideration of minimum machining cost, a step of determining, for each determined process, tooling conditions represented by a combination of a tool and holder, tool movement conditions suitable for each determined process, and cutting conditions of machining capabilities adjusted for the determined tooling conditions, and accessing a machining information database that contains a rule for determining a machining mode, a rule for determining cutting conditions and data for computing machining capabilities, wherein the value of machining capabilities is computed by correcting a reference value of machining capabilities, using a comparative value of the rigidity of a predetermined reference tooling and rigidity of an actually used tooling.

* * * * *